United States Patent
Poole et al.

(10) Patent No.: US 9,816,001 B2
(45) Date of Patent: Nov. 14, 2017

(54) LOW EMISSION, HIGH SCRUB VAE LATEX PAINTS

(75) Inventors: Elizabeth A. Poole, Spartanburg, SC (US); Rajeev Farwaha, Belle Mead, NJ (US); Brett C. Beauregard, League City, TX (US); Alexander Madl, Frankfurt am Main (DE); Jörg L. Schulte, Frankfurt (DE); Harmin Müller, Hofheim (DE); Kristy Jo Beckman, Houston, TX (US)

(73) Assignee: CELANESE INTERNATIONAL CORPORATION, Dallas, TX (US)

(*) Notice: Subject to any disclaimer, the term of this patent is extended or adjusted under 35 U.S.C. 154(b) by 1664 days.

(21) Appl. No.: 12/584,152

(22) Filed: Sep. 1, 2009

(65) Prior Publication Data
US 2010/0056696 A1 Mar. 4, 2010

Related U.S. Application Data

(60) Provisional application No. 61/190,727, filed on Sep. 2, 2008.

(51) Int. Cl.
*C09D 131/04* (2006.01)
*C09D 133/08* (2006.01)
(Continued)

(52) U.S. Cl.
CPC ......... *C09D 131/04* (2013.01); *C09D 133/08* (2013.01); *C08K 3/0033* (2013.01); *C08L 31/04* (2013.01); *C08L 33/08* (2013.01)

(58) Field of Classification Search
CPC ...... C08L 2666/04; C08L 31/04; C08L 33/08; C09D 131/04; C09D 133/08; C08K 3/0033
(Continued)

(56) References Cited

U.S. PATENT DOCUMENTS

| 3,404,112 A | 10/1968 | Lindemann et al. ........ 260/29.6 |
| 3,404,113 A | 10/1968 | Lindemann et al. ........ 260/29.6 |

(Continued)

FOREIGN PATENT DOCUMENTS

| DE | 21 48 457 | 4/1973 | ............. C09D 3/82 |
| DE | 21 48 458 | 4/1973 | ............ C08F 218/04 |

(Continued)

OTHER PUBLICATIONS

DE 10113227 A1, Sep. 2002, DERWENT Ab.*
DuPont™ Zonyl® Fluoroadditives as Antiblock Agents, A Comparative Study, Product Literature, Jan. 2003.

*Primary Examiner* — Satya Sastri
(74) *Attorney, Agent, or Firm* — Michael W. Ferrell; Ferrells, PLLC; Anna L. Kinney

(57) ABSTRACT

A water-based, low-emission latex paint formulation includes a vinyl acetate/ethylene (VAE) latex including a VAE resin with from 80 to 95 weight % vinyl acetate residue and from 5 to 20 weight % ethylene residue, optionally including additional monomers as well as a pigment composition including inorganic solids selected from inorganic pigments, inorganic fillers and mixtures thereof present in an amount such that the paint formulation has a pigment volume concentration (PVC) of from 25% to 85%. The formulations are suitable for eggshell and flat latex paints and exhibit surprising durability.

45 Claims, 5 Drawing Sheets

(51) Int. Cl.
*C08K 3/00* (2006.01)
*C08L 31/04* (2006.01)
*C08L 33/08* (2006.01)

(58) Field of Classification Search
USPC .......................................................... 524/563
See application file for complete search history.

(56) References Cited

U.S. PATENT DOCUMENTS

| | | | |
|---|---|---|---|
| 3,440,199 A * | 4/1969 | Volpe | C09D 131/04 523/410 |
| 3,563,944 A | 2/1971 | Bauer et al. | 260/29.6 |
| 3,729,438 A | 4/1973 | Plesich et al. | 260/29.6 R |
| 3,814,716 A | 6/1974 | Kowalski et al. | 260/29.6 T |
| 3,935,151 A | 1/1976 | Nickerson et al. | 260/29.6 WB |
| 3,969,296 A | 7/1976 | Wassenburg et al. | 260/29.6 TA |
| 4,219,454 A | 8/1980 | Iacoviello | 260/29.6 TA |
| 5,208,285 A * | 5/1993 | Boyce | C09D 131/04 524/516 |
| 5,308,890 A | 5/1994 | Snyder | 523/201 |
| 5,470,906 A | 11/1995 | Craun et al. | 524/507 |
| 5,576,384 A * | 11/1996 | N olken et al. | 524/806 |
| 5,874,498 A * | 2/1999 | Daniels | C09D 151/00 524/560 |
| 6,028,139 A | 2/2000 | Farwaha et al. | 524/715 |
| 6,087,437 A | 7/2000 | Farwaha et al. | 524/555 |
| 6,174,960 B1 * | 1/2001 | Phan | C09D 131/04 427/387 |
| 6,624,243 B2 * | 9/2003 | Stark | C08F 230/08 524/806 |
| 7,041,727 B2 | 5/2006 | Kubicek et al. | 524/520 |
| 2002/0007004 A1 * | 1/2002 | Stevenson et al. | 524/523 |
| 2003/0018121 A1 * | 1/2003 | Weitzel et al. | 524/556 |
| 2007/0049663 A1 * | 3/2007 | Cordova | 524/52 |
| 2008/0145552 A1 | 6/2008 | Berrettini et al. | 427/444 |

FOREIGN PATENT DOCUMENTS

| | | | | |
|---|---|---|---|---|
| DE | 10113227 A1 * | 9/2002 | | C08F 265/04 |
| EP | 327376 A2 * | 8/1989 | | C08F 218/04 |

* cited by examiner

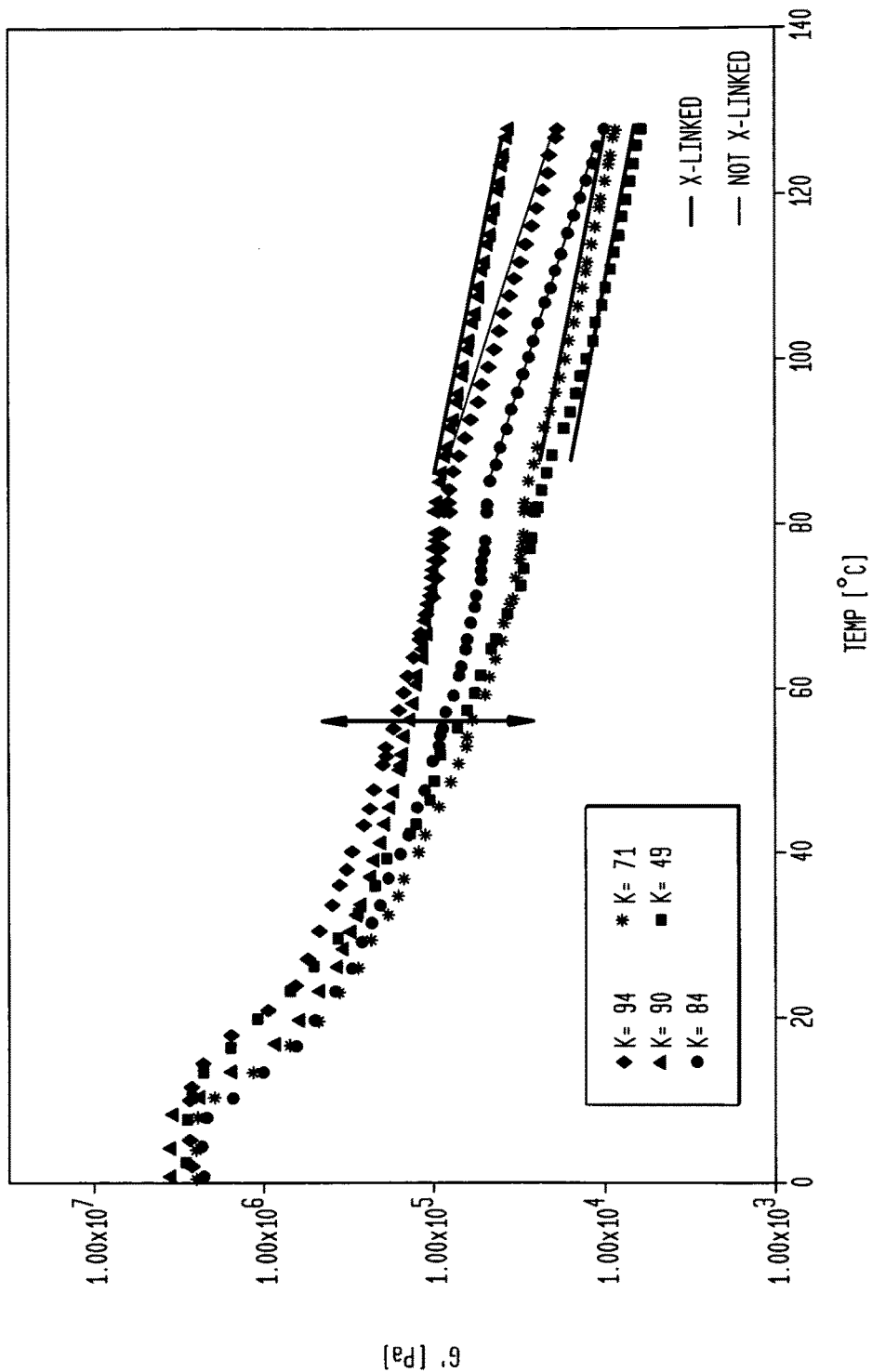

LOW EMISSION, HIGH SCRUB VAE LATEX PAINTS

CLAIM FOR PRIORITY

This non-provisional application claims the benefit of the filing date of U.S. Provisional Patent Application Ser. No. 61/190,727, of the same title, filed Sep. 2, 2008. The priority of U.S. Provisional Patent Application Ser. No. 61/190,727 is hereby claimed and the disclosure thereof is incorporated into this application by reference.

FIELD OF INVENTION

This invention relates to water-based, low-emission latex paint formulations including a vinyl acetate/ethylene (VAE) latex and inorganic solids present in an amount such that the paint formulation has a pigment volume concentration (PVC) of from 25% to 85%. These formulations are suitable for eggshell and flat latex interior paints.

BACKGROUND OF THE INVENTION

There are numerous references which describe latex paint compositions incorporating a vinyl acetate-ethylene emulsion as a binder. Representative patents include U.S. Pat. Nos. 3,404,112 and 3,404,113. The '112 patent discloses the use of vinyl acetate-ethylene latexes as a film-forming binder in an aqueous paint composition. The '113 patent incorporates a triallylcyanurate in the polymerization process to enhance the degree of insolubles. The particle size of the binder will range from about 0.1 to 2 microns. The ethylene content will range generally from 5 to 40, preferably about 10-15% by weight of the polymer.

U.S. Pat. No. 3,440,199 to Lindemann et al. discloses aqueous paint compositions incorporating an inter polymer of vinyl acetate, ethylene and glycidyl acrylate. The addition of the glycidyl acrylate into the polymer system enhances adhesion to raw wood without the use of a primer coat.

U.S. Pat. No. 4,219,454 to Iacoviello, et al. discloses the use of a vinyl acetate copolymer emulsion for preparing semi-gloss and flat interior paint compositions. Vinyl acetate-ethylene emulsions were disclosed with preferred latexes having a particle size such that less than 5% of the particles had a size greater than 0.65 microns and less than 5% had a particle size of less than 0.33 microns. Emulsions were prepared by introducing the monomers of vinyl acetate, optionally with a small amount of butyl acrylate into a stabilizer system of water, hydroxyethyl cellulose and multiple nonionic surfactants. The $T_g$ of the vinyl acetate ethylene polymer was approximately 22° C., preferred levels of ethylene from about 10 to 15% by weight.

U.S. Pat. No. 5,470,906 to Craun, et al. discloses an aqueous ambient dry paint coating incorporating an emulsion copolymerized addition polymer containing an oligomer selected from polyurethane or polyester having a $T_g$ below about −20° C. and a number average molecular weight between 300 and 5,000. The coating is free of organic coalescing solvents. Vinyl acetate and butylacrylate (80/20) are disclosed as conventional polymeric binders for consumer based paints with the binder having an elevated $T_g$ lowered temporarily through the use of a volatile coalescing solvent. Low molecular weight oligomers of urethanes and polyester urethane copolymers were used in place of conventional coalescing solvents to achieve desired properties without objectionable odor and VOCs.

U.S. Pat. No. 3,969,296 to Wassenburg, et al. discloses a process for producing a vinyl acetate emulsion having improved adhesion characteristics against usual wet-cleaning with a cloth, sponge, etc. The emulsion is prepared by copolymerizing a small amount of a glycidyl ester of an alpha-beta ethylenically unsaturated acid with vinyl acetate followed by neutralization with ammonia.

U.S. Pat. No. 3,563,944 to Bauer et al. discloses a colloid-free vinyl acetate emulsion suited for producing paint formulations having good scrub resistance, film forming properties, mechanical stability, etc. The copolymer consists of vinyl acetate and a lower alkyl acrylate, or an alkyl maleate. Enhanced stability is imparted by polymerizing a portion of the monomers in a colloid-free aqueous medium and then adding more monomer during the course of reaction and using a nonionic surfactant to stabilize the polymerization.

The need today for architectural coating materials free from volatile organic content (VOC) for both safety and health reasons is well documented.

Latex paint compositions have captured a significant portion of the indoor and outdoor paint market because they have significant advantages as compared with organic solvent based paints. Three of the most important advantages are: cleanup is easier with latex paints than with solvent based paints; there is substantially less air pollution associated with latex paints as opposed to solvent based paints; and fire hazards from paint thinners and other solvents needed with solvent based paints are eliminated using latex paints. On the other hand, the coating properties and storage stability of latex paints have been somewhat inferior to those of the solvent type, particularly in obtaining desired film thickness, durability and adhesion. This is especially so in more modestly priced latex products with higher PVC.

Although a significant reduction or elimination of volatile organic solvents is achieved through the use of latex products, the surfactants remaining after water evaporation, coupled with the relatively high molecular weight of the polymers, frequently prevent complete coalescence, which is needed for superior durability, for example, scrub resistance. Conventional vinyl acetate based latex vehicles often require coalescing solvents in order for the latex to be suitable for use in a paint formulation. Coalescing solvents are incorporated into the paint composition to externally and temporarily plasticize the latex polymer for a time sufficient to develop film formation. This provides volatile organics, which are undesirable. That is, coalescing solvents diffuse out of the film after film formation and thus contribute to the VOC level emitted to the environment. Paints formulated with standard vinyl-acrylic latex vehicles and no coalescing solvent generally do not pass the requirement of film formation at temperatures as low as 40° F. Such paints also display cracking upon drying and provide poor durability. One approach to attempt to overcome these deficiencies is to increase the acrylate level to lower the minimum film formation temperature of the latex. In particular, acrylate monomers that lower Tg are effective, such as butyl acrylate. Although the approach addresses the cracking and durability problems, paints prepared from these latexes are more costly and they also display dirt pickup, due to unacceptable tackiness after drying. Therefore, one goal is to prepare a latex which permits a low film formation temperature without causing the dried film to become tacky and to have sufficient hardness to retain good durability.

Alkylphenol ethoxylates (APEs) represent a class of nonionic surfactants which are used in latex products to improve adhesion and film forming, and in paint formulations to provide pigment wetting. These compounds are believed to break down in the environment to related compounds that are persistent in the environment and act as endocrine disruptors. Due in part to regulations in Europe, as well as recently adopted water quality criteria in the United States, there is a need to use APE-free polymer emulsion binders in preparation of APE-free paint formulations. The evolving environmental controls of APEs are reminiscent of the 1970s ban on lead compounds in paint, enacted to prevent serious health risks, especially to children.

Conventional polymeric binders used in latex paint formulations are typically emulsion polymers containing surfactants that are based on alkylphenol ethoxylates. Previously known emulsion polymeric binders that are free of alkylphenol ethoxylates have not been popular, because they do not provide the necessary adhesion, perform more poorly as emulsifiers, and provide poorer color acceptance.

While the art is replete with formulations for latex paints, existing products, especially low-emission products, do not exhibit preferred characteristics in terms of film forming, durability, adhesion, or stain resistance and often include undesirable components, such as alkylphenol ethoxylates.

SUMMARY OF THE INVENTION

There is provided in accordance with this invention water-based, low-emission latex paint formulations including a vinyl acetate/ethylene (VAE) latex and inorganic solids present in an amount such that the paint formulation has a pigment volume concentration (PVC) of from 25% to 85%. These formulations are suitable for eggshell and flat latex interior paints and are surprisingly durable, stain resistant and are superior film-formers. The paint formulations are based on a new class of APE-free resins available from Celanese Emulsion Polymers, Houston, Tex., and are designated EcoVAE® 405 Series, or may be obtained by simply requesting high-scrub VAE resin, or requesting suitable resins using like terminology.

Without intending to be bound by any particular theory, it is believed that the paint properties are due to the selection of components, including the VAE latexes from Celanese which may include much more uniform film formation in the latex than conventional VAE latexes, providing for elevated scrub values and other improvements described herein. Particularly preferred latexes tend to gel when cured at elevated temperatures, indicating toughness of the compositions.

BRIEF DESCRIPTION OF THE DRAWINGS

The invention is described in detail below with reference to the appended drawings, wherein like numerals designate similar parts. In the Figures:

FIG. 5 is a diagram showing a correlation between K-values and G' (storage modulus) values.

DETAILED DESCRIPTION OF THE INVENTION

The invention is described in detail below with reference to several embodiments and numerous examples. Such discussion is for purposes of illustration only. Modifications to particular examples within the spirit and scope of the present invention, set forth in the appended claims, will be readily apparent to one of skill in the art. Terminology used herein is given its ordinary meaning consistent with the exemplary definitions set forth immediately below.

In testing procedures discussed herein, unless otherwise noted, ambient conditions are specified.

The term "latex" is used herein in its conventional meaning, i.e., a dispersion of particulate matter in an aqueous phase which contains an emulsifier or surfactant suitable for preparing the latex. Latex binders, as used herein, comprise a polymer dispersed in an aqueous phase with an appropriate emulsifier system. A resin or binder gives the paint adhesion to the substrate, and seals and protects the substrate.

The term water-based, as used herein, refers to the aqueous phase in which the resin is dispersed.

The term glass transition temperature ($T_g$) is used herein in its conventional meaning; i.e., the temperature at which a polymer changes from hard and brittle to soft and pliable at a midpoint from Differential Scanning Calorimetry (DSC) measurement with a heating rate of 10 K per minute. In other words, on a curve of temperature versus modulus, the temperature at which a polymer is at the midpoint of transition from hard and brittle to soft and pliable is referred to as the glass transition temperature. Increasing a binder $T_g$ results in improved hardness and, therefore, block resistance of a coating film. The ability of a polymer to deform and to bridge the film-film interface decreases with increasing $T_g$. $T_g$ differs from minimum film forming temperature (MFFT) in that MFFT reflects the ability of a product to form a film without coalescent, whereas $T_g$ reflects the film toughness of a product. Toughness is a measure of the maximum amount of energy a material can absorb before failure occurs. A tougher film is more resistant to abrasion force. The $T_g$ determines the MFFT and the physical characteristics of a film formed by a polymer. The MFFT is usually lower than $T_g$ and the differential is dependent on the degree of polymer plasticization by water. The gap between $T_g$ and MFFT is typically greater for a VAE latex than for an acrylic latex. Although not intending to be bound by theory, this presumably is due to a high percentage of hydrophilic vinyl acetate monomer present.

Figure 1:
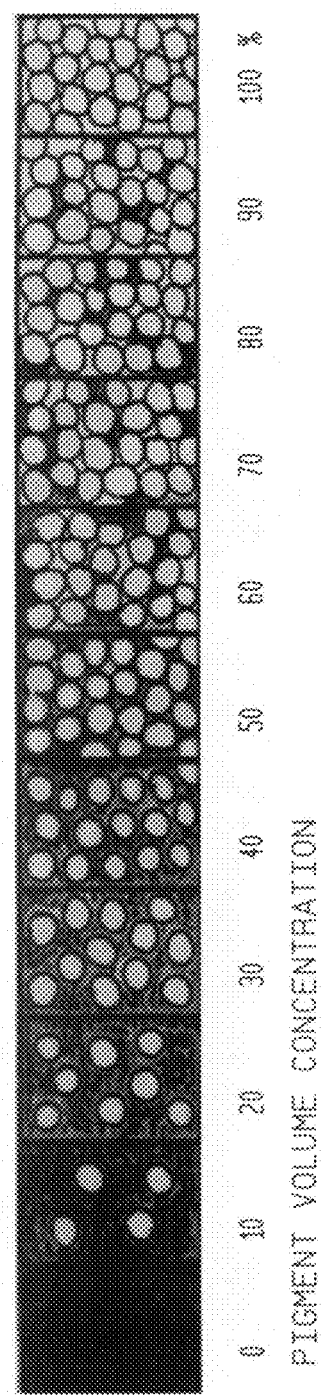
FIG. 1 is a schematic illustration of pigment volume concentration at various levels, a characteristic of paint formulations.

Pigment Volume Concentration (PVC) measures the volume contribution of pigment to the paint. A graphical representation of the effect of PVC is shown in FIG. 1. PVC is calculated according to the following formula.

$$PVC(\%) = \frac{(\text{Volume of Pigments(s)} + \text{Volume of Extender(s)})}{(\text{Volume of Pigment(s)} + \text{Volume of Extender(s)} + \text{Volume of Solid Binder(s)})} \times 100$$

Volume solids measures the amount of actual coating that will remain on a wall after application; i.e., after the coating has dried. When additives are present, their volume is not included in determining the total dry volume. Volume solids is calculated according to the following formula.

$$\text{Volume solids (\%)} = \frac{\text{dry volume of pigment(s)} + \text{dry volume of extender(s)} + \text{dry volume of binder(s)}}{\text{total volume of formulation}} \times 100$$

The term low-emission paint formulation, as used herein, refers to a paint formulation with a Volatile Organic Content (VOC) of less than 100 g/L. Volatile Organic Content of a paint formulation refers to the presence of volatile organic components; i.e., any volatile component that contains carbon and is not listed by the EPA as an exempt solvent. VOC sources may include co-solvents, including glycols, which help with wet edge application, open time, and freeze-thaw resistance, and coalescents, which help the latex polymer form a film by lowering $T_g$ as the film dries; emulsion components and most additives at low levels. For instance, amino methyl propanol is a volatile compound used to adjust pH. Volatile Organic Content is calculated by the following formula.

$$\text{Volatile Organic Content} = \frac{\text{(Weight (grams) of } VOC)}{\text{(Total Volume (Liters) of formula} - \text{Volume of Water} - \text{Volume of Exempt Solvents)}}$$

Commercially available latex paints may have VOC levels higher than 150 g/L. In contrast, a paint formulation according to the invention may have a very low volatile organic content, such as less than 5 g/L.

Key parameters important to the customer include $T_g$, particle size, viscosity, stability, and robustness.

Figure 2:
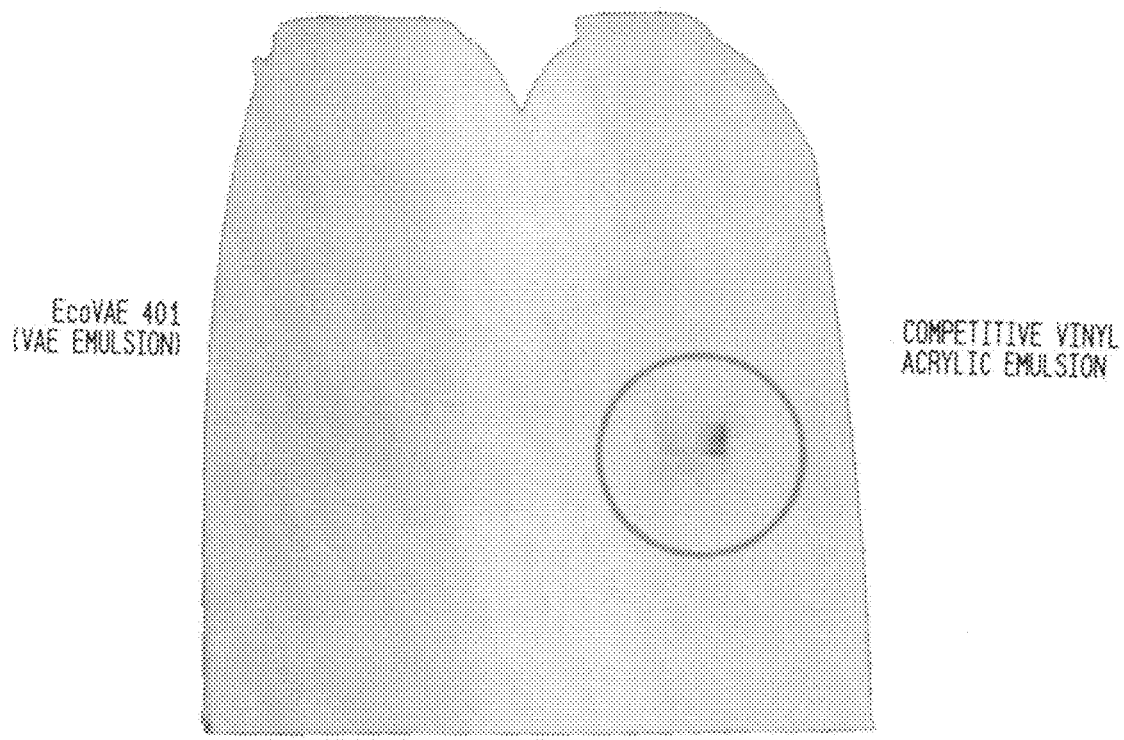
FIG. 2 is a visual example illustrating scrub resistance measurement according to ASTM Method D2486-06.
Figure 3:
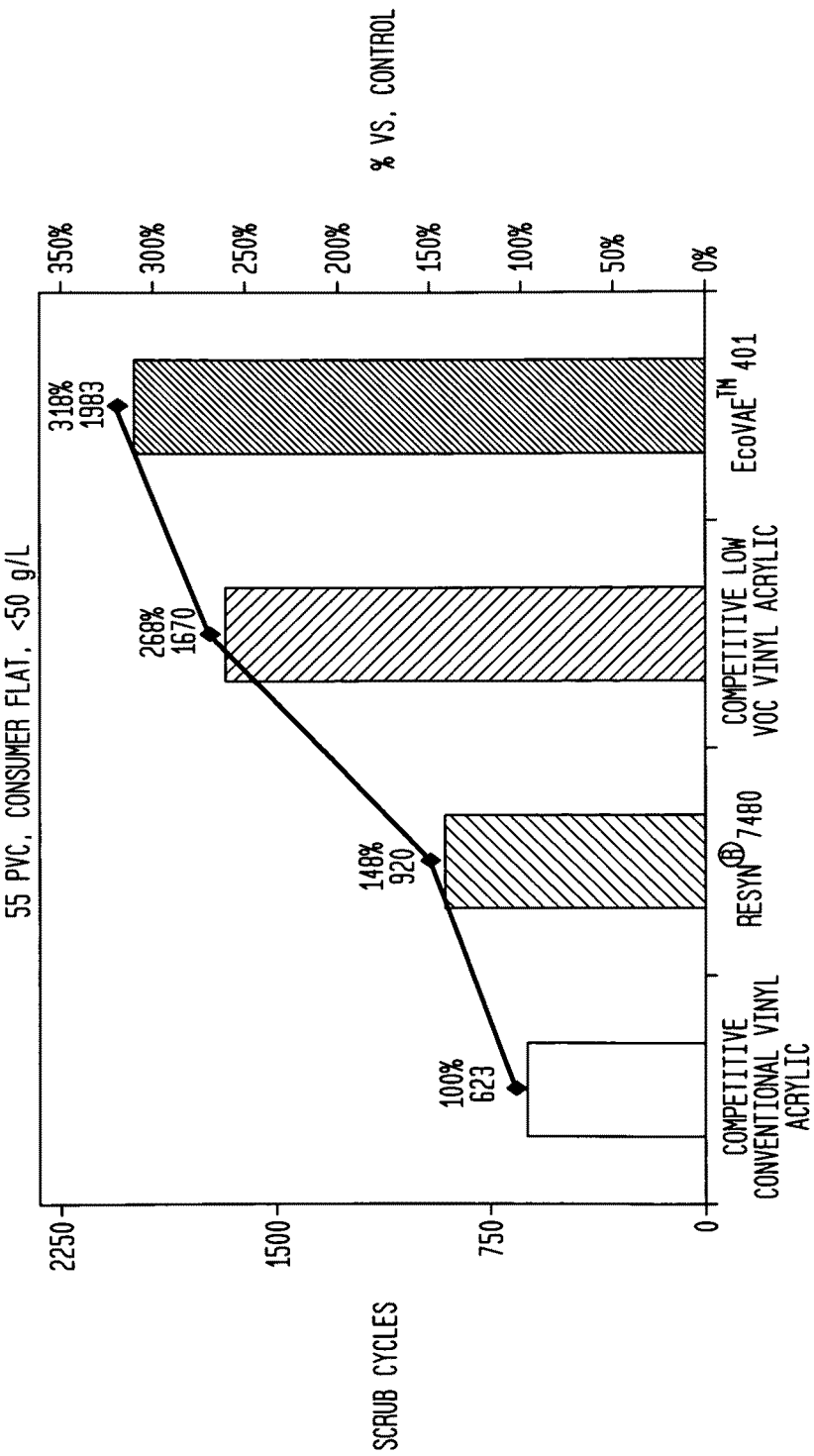
FIG. 3 is a graphical representation comparing scrub resistance of paint formulations containing commercially available resins.

Robustness can be determined in part by evaluating "scrub resistance" or scrubbability, the resistance of wall paints to erosion caused by scrubbing. Scrub resistance is measured using ASTM D2486-06, "Standard Test Methods for Scrub Resistance of Wall Paints," an example of which is shown in FIG. 2. These test methods determine the relative resistance of different paints to erosion when repeatedly scrubbed during the life of the paint. Test Method A measures scrub resistance by the traditional cycles-to-failure concept. In an attempt to improve reproducibility, Test Method B was developed. Test Method B provides a ratio, expressed as a percentage, of cycles-to-failure obtained on the test paint to that obtained on a concurrent run with a known reference paint. This value is represented herein as "relative scrub index." A graphical example of comparative scrub resistance is shown in FIG. 3. Note the percentage error allowed for in Test Method B, reproduced as follows:

11.1.3 On the basis of an interlaboratory study in which operators in five laboratories tested five coatings, including both flat and semi-gloss coatings, the following criteria should be used for judging the acceptability of the results at the 95% confidence level:

11.1.3.1 Repeatability—Two results (each the mean of duplicate measurements) obtained by the same operator should be considered suspect if they differ more than 25% of their mean value.

11.1.3.2 Reproducibility—Two results (each the mean of duplicate measurements) obtained by operators in different laboratories should be considered suspect if they differ by more than 58% of their mean.

In FIG. 3, Resyn® 7480 refers to a vinyl acetate/acrylate copolymer emulsion available from Celanese Emulsion Polymers, Houston, Tex. The results of these tests are directly related to the polymer quality. Great scrub durability allows a paint formulator to use less binder (in higher PVC paints) while maintaining acceptable performance. Scrub durability is related to toughness and elasticity of a coating film. Compared to acrylic, a VAE latex film typically displays higher mechanical strength manifested by higher modulus and tensile strength. Compared to acrylic latices, a VAE latex also typically exhibits a lower rubbery plateau modulus and a higher tan delta peak in the Tg region, suggesting greater ability of a VAE polymer to deform under stress by viscous flow.

Blocking refers to the relative tackiness of a dry coating. It is desirable that two dry, coated surfaces when placed in contact do not block or stick together. Conventional knowledge would suggest that VAE copolymers would generally not have exceptional block resistance, given low $T_g$ values. Block resistance is also a function of film surface properties. One skilled in the art of emulsion polymerization can alter surface properties by adjusting monomer composition, particle stabilization strategy, and process conditions. To improve anti-blocking properties, it is known to blend a VAE latex with a latex having better anti-blocking properties, such as a vinyl acetate homopolymer or acrylic latex. Addition of fluorocarbon surfactants is also known to improve block resistance by modifying surface properties. A fluorocarbon surfactant acts as a surface-active agent that blooms to the top of a film (the air interface) as it dries or cures and acts as a release layer that interferes with the intermingling of resin layers of two films in contact with one another. Additives of this class may be obtained from DuPont™ under the designation Capstone™ or Zonyl®, or 3M™ under the designation Novec™, for example. See "DuPont™ Zonyl® Fluoroadditives as Antiblock Agents, A Comparative Study", Product Literature, January 2003. See also, United States Patent Application 2008/0145552 to Berrettini et al. which provides examples of suitable fluoroadditives. Fluorochemical additives may be added in an amount of from about 0.05 weight % up to about 10 weight %. See also U.S. Pat. No. 7,041,727 to Kubicek et al.

Wet adhesion refers to the ability of a latex paint to adhere to a substrate under wet conditions. Wet adhesion is a critical property not only for exterior paints, but also for some interior applications, such as in kitchens and bathrooms.

Ethylene vinyl acetate binders (VAEs) are used primarily in interior with some exterior masonry applications. VAEs are characterized by low $T_g$ values, good touch-up in interior flat paints, and good efflorescence resistance on masonry.

The paint of the invention comprises a resin that exhibits an improved scrub performance of greater than 110% that of prior art and commercial paints containing VAE resins. Without being bound to any theory, we believe that the superior scrubbability of the present paint is due to increased crosslink density in the resin, higher film strength, or more uniform film formation.

Emulsion polymerization of ethylenically unsaturated monomers are well known as set forth in U.S. Pat. No. 5,874,498 to Daniels et al. and U.S. Pat. No. 6,028,139 to Farwaha et al., the disclosures of which are incorporated herein in their entirety. However, the resins of Daniels et al. are obviously more difficult and costly to make, since the molecular weight has to be carefully controlled.

The preparation of synthetic resin copolymer dispersions, where the monomers are copolymerized with hydrolysable, unsaturated organic silicon compounds, is known. See, for example, U.S. Pat. No. 6,087,437 to Farwaha, et al., U.S. Pat. No. 6,028,139 to Farwaha, et al. and U.S. Pat. No.

6,174,960 to Phan et al. Synthetic resin dispersions based on vinyl acetate with 0.5 to 1% by weight, based on the total amount of monomers, of a copolymerizable silane, such as, for example, vinyltrimethoxysilane, ω-methacryloxypropyltrimethoxysilane and vinyl tris(2-methoxyethoxy)silane, are also known from U.S. Pat. No. 3,729,438 to Plesich et al. The polymer crosslinks on drying, giving rise to a clear, high-gloss film. Further, U.S. Pat. No. 3,814,716 to Kowalski et al. describes synthetic resin dispersions based on vinyl acetate, acrylic esters, maleic and fumaric esters with 0.5 to 5% by weight of a copolymerizable silane. On drying the synthetic resin dispersion yields clear, high-gloss and crosslinked films with excellent water and solvent resistance. In addition, the use of polymeric binders in aqueous dispersion for the preparation of structural coating materials are known from DE-PS 2,148,457, where the synthetic resin dispersions contain polymers from vinyl esters, acrylic esters or butadienestyrene copolymers into which the silanol groups have been introduced by polymerization. Furthermore, the preparation of aqueous synthetic resin dispersions based on vinyl esters of carboxylic acids of 2 to 18 carbon atoms, ethylene, optionally up to 25% by weight of other olefinically unsaturated monomers and 0.3 to 5% by weight, based on the total amount of monomers, of an unsaturated hydrolysable organic silicon compound, is known from DE-PS 2,148,458. Films prepared from the synthetic resin dispersions described with copolymers containing 1 to 2% by weight of the silicon compounds named above, exhibit high drying and wet peeling strengths on glass and asbestos cement. However, the synthetic resin dispersion prepared according to Example 1 of the above DE-PS possesses a 0.2% by weight content of unreacted monomeric vinyl acetate and the synthetic resin dispersions prepared according to Examples 6 and 10 contain, respectively, 3.8 and 4.8% by weight of methanol, in each case based on the polymeric part.

The use of other crosslinking monomers in the preparation of synthetic resin copolymer dispersions is similarly known, as disclosed in U.S. Pat. No. 6,624,243 to Stark et al. Such monomers may include epoxy containing monomers: for example, monomers selected from the group consisting of glycidyl acrylate, glycidyl methacrylate, allyl glycidyl ether, vinyl glycidyl ether, vinylcyclohexene oxide, limonene oxide, myrcene oxide, caryophyllene oxide, vinyltoluenes and styrenes substituted with a glycidyl radical in the aromatic moiety, and vinylbenzoates substituted with a glycidyl radical in the aromatic moiety. Preferably, the monomers are selected from glycidyl methacrylate and allyl glycidyl ether. Such monomers may also include polymerizable 1,3-dicarbonyl compounds: for example, acetoacetoxyethyl acrylate, acetoacetoxypropyl methacrylate, acetoacetoxyethyl methacrylate, acetoacetoxybutyl methacrylate, 2,3-di (acetoacetoxy)propyl methacrylate, and allyl acetoacetate. The amount of 1,3-dicarbonyl compound may range from 0.01 to 2% by weight, for example from 0.1 to 1% by weight, based in each case on the overall weight of the monomers used. Preferably, the monomers are selected from acetoacetoxypropyl methacrylate, acetoacetoxyethyl methacrylate, acetoacetoxybutyl methacrylate, 2,3-di (acetoacetoxy)propyl methacrylate and allyl acetoacetate.

A variety of comonomers, e.g., ethylenically unsaturated monomers, can be copolymerized with the vinyl acetate and ethylene. Any person skilled in the art knows on the basis of the $T_g$ of the polymers and the polymerization parameters which monomers or mixtures of monomers must be employed to achieve resins of the parameters applied in this invention. The main monomers are optionally copolymerized with small amounts of olefinically unsaturated silicon compounds containing hydrolysable groups, for instance, silanes. The sum of the percentages of the monomers employed to form the copolymer is always 100.

Suitable sterically hindered alkoxylated silane monomers are disclosed in U.S. Pat. No. 6,174,960 to Phan et al., and are vinyltriisopropoxy silane, vinylpropyltriisopropoxy silane, vinylpropyltriisobutoxy silane, vinyltriisobutoxy silane, vinylpentyltri-t-butoxy silane, vinylpropylmethyldipentoxy silane, and vinylpropyltri-sec-butoxysilane. The sterically hindered alkoxylated silane monomer is preferably vinyltriisopropoxysilane. The disclosure of '960 to Phan et al. is incorporated herein by reference in its entirety.

Blends of hard and soft emulsion polymers are known in the art. Blending provides a cost-effective solution to boost the performance of VAE-based paints. EP 466,409 A1 describes a system which contains a mixture of a hard latex with $T_g$ greater than 20° C., and a soft latex with a $T_g$ less than 15° C. The blend system described in EP 466,409 A1 is disclosed to result in films with adequate film formation and hardness without the use of a coalescent. U.S. Pat. No. 5,308,890 to Snyder describes a blend of emulsion polymers containing a soft stage polymer having a $T_g$ of less than 50° C. and a hard stage polymer having a $T_g$ of from 20° C. to 160° C., wherein the $T_g$ of the soft stage polymer is lower than the $T_g$ of the hard stage polymer, and the hard stage polymer does not form a film at ambient temperature. U.S. Pat. No. 3,935,151 to Nickerson, et al. describes an approach to improving the wet adhesion properties of vinyl acetate polymers by blending into a vinyl acetate terpolymer, a copolymer which is a vinyl-acrylic, a vinyl chloride-acrylic or an all-acrylic latex containing hydroxy methyl diacetone acrylamide (HMDAA). Similarly, U.S. Pat. No. 5,208,285 to Boyce, et al. describes providing improved wet-adhesion properties to vinyl acetate copolymers by blending into the vinyl acetate polymer emulsion, a minor amount of an all-acrylic emulsion or other emulsions having copolymerized therein a small quantity of a cyclic ureido monomer having wet adhesion-imparting properties, and the disclosure thereof is incorporated herein in its entirety. Hybrid polymer compositions combining VAE with emulsified epoxy resin and isophoronediamine hardening agent have also demonstrated improved wet adhesion. Because many formulation variables affect cohesive strength, and therefore scrub resistance, blending can drastically change the film morphology and latex/pigment interaction and, ultimately, film strength. As a result, latex characteristics may not be proportional to the blend ratio.

Two types of emulsions commonly used in formulating latex paints include the all acrylic system, e.g., the systems employing copolymerized methyl methacrylate, butyl acrylate, or 2-ethylhexylacrylate with small proportions of acrylic acid, etc., as may be desired, and vinyl acetate formulations usually in combination with a small proportion of the above lower alkyl acrylates, e.g., butyl acrylate. Heretofore, the all acrylic system has been used in premium quality paints as the emulsions have provided for good water resistance, desired leveling, film hardness, durability, scrubbability, etc. The vinyl acetate-acrylic copolymer systems have been utilized in formulating interior flat and semi-gloss paints and exterior house paints. The vinyl acetate-butyl acrylate latices when used in paint formulations result in paint films which have excellent toughness, scrub resistance and durability, while the vinyl acetate-dibutyl maleate emulsions impart good abrasion resistance and flexibility as well as durability.

The paint formulations of the present invention may be prepared from a blend of aqueous emulsion polymers which are curable to form a film. The blend may contain an ethylene-vinyl acetate (VAE) polymer and an acrylic or vinyl acrylic (i.e., vinyl acetate/butyl acrylate) polymer. Such blends are desirable for achieving high performance characteristics, such as hardness, anti-blocking, and/or hi-gloss, in the paint formulation. The proportions of the respective polymers usually are balanced to provide desired properties in the paint formulation, as is well known in the art of latex paint.

The acrylic or vinyl acrylic polymer is present in an acrylic modified ethylene-vinyl acetate polymer blend in an amount of from about 15 to about 50 weight percent, preferably from about 20 to about 30 weight percent, based on the total weight of the acrylic polymer and the ethylene-vinyl acetate polymer. The ethylene-vinyl acetate polymer is present in an amount of from about 50 to about 85 weight percent, preferably from about 70 to 80 weight percent, based on the total weight of the acrylic polymer and the ethylene-vinyl acetate polymer.

Suitable acrylic unsaturated functional monomers commonly used to produce all-acrylic emulsions include esters of methacrylic acid, including methyl methacrylate and butyl methacrylate, and esters of acrylic acid, including ethyl acrylate, butyl acrylate and 2-ethylhexyl acrylate. Specific examples of acrylate monomers include methyl acrylate, ethyl acrylate, butyl acrylate, 2-ethyl hexyl acrylate, decyl acrylate, methyl methacrylate, butyl methacrylate, iso-butyl methacrylate, iso-bornyl methacrylate, hydroxy ethyl acrylate and hydroxy ethyl methacrylate. Alternatively, the acrylic polymer may comprise a styrene acrylic latex.

While not being bound by any particular theory, the present inventors believe that crosslinking occurs between the sterically hindered alkoxysilane functionality on the acrylic polymer by means of a hydrolysis reaction to give silanols with subsequent condensation reaction between silanols and/or carboxyl groups on the acrylic polymer. Such crosslinking occurs during film formation of the coating composition, most probably after particle coalescence or drying of the coating composition. The advantage of preparing the coating composition with sterically hindered alkoxylated silane monomers is that crosslinking during the emulsion polymerization of the acrylic polymer and storage of the acrylic modified ethylene-vinyl acetate polymer blend, especially in the presence of carboxyl groups, is minimized.

The new resins having the components described herein may be obtained from Celanese™ Emulsion Polymers under the designation EcoVAE® 405 Series or by simply requesting high-scrub VAE resin, or by requesting suitable resins using like terminology.

The paints are formulated using techniques known to those skilled in the art of manufacturing paint. Generally, water, defoamer, pigment, filler (also known as extender pigment) and surfactant stabilizer (in addition to emulsifiers used during emulsion polymerization) are combined to form the grind, where the pigments and fillers are ground to a desired particle size as indicated by a Hegman reading of 2 to 6. The most common way dispersion is checked is using a "Hegman." Hegman numbers relate to dispersion measured in microns. A higher Hegman number means finer grind. A Hegman number of about 2 to about 3 is almost exclusive to a flat paint. Satin and Eggshell paints can have Hegman numbers in the range of about 3 to about 6 depending upon formulation, preferably in the range of 3 to less than 5. A Hegman number of about 6 represents a lower semi-gloss range. Additional water, latex binder, rheology modifiers, biocides and the like are added to the grind and the entire batch is blended and adjusted to desired Hegman readings and viscosity.

Preferred fillers used are, for example, calcium carbonate, magnesite, dolomite, kaolin, mica, talc, silica, calcium sulfate, feldspar, barium sulfate and opaque polymer.

Examples of white pigments used are zinc oxide, zinc sulfide, basic lead carbonate, antimony trioxide, lithopone (zinc sulfide+barium sulfate) and, preferably, titanium dioxide.

Examples of inorganic colored pigments which may preferably be used are iron oxides, carbon black, graphite, luminescent pigments, zinc yellow, zinc green, Paris blue, ultramarine, manganese black, antimony black, manganese violet or Schweinfurt green.

Suitable organic colored pigments preferably are, for example, sepia, gamboge, Cassel brown, toluidine red, para red, Hansa yellow, indigo, azo dyes, anthraquinone and indigo dyes as well as dioxazine, quinacridone, phthalocyanin, isoindolinone and metal complex pigments of the azomethine series.

The fillers may be used as individual components. Mixtures of fillers such as, for example, calcium carbonate/kaolin and calcium carbonate/kaolin/talc have been found to be particularly useful in practice. To increase the hiding power and to save on titanium dioxide, finely divided fillers such as, for example, finely divided calcium carbonate and mixtures of various calcium carbonates with different particle size distribution are frequently used. Calcined clays are commonly used to increase dry opacity as they help incorporate air voids into the dry film. Air voids create a big difference in refractive index in the film and scatter light, yielding more opacity in the film once cured.

To adjust the hiding power, the shade and the depth of color the fillers are mixed with appropriate amounts of white pigment and inorganic and/or organic colored pigments.

To disperse the fillers and pigments in water, 0.1 to 0.6% by weight, based on the total weight of the aqueous preparation, of auxiliaries based on anionic or non-ionic wetting agents, such as preferably, for example, sodium pyrophosphate, sodium polyphosphate, naphthalenesulfonate, sodium polyacrylate, sodium polymaleinates and polyphosphonates such as sodium 1-hydroxyethane-1,1-diphosphonate and sodium nitrilotris(methylenephosphonate), may be added.

Thickeners which may be used are, inter alia, preferably cellulose derivates such as methylcellulose (MC), hydroxyethylcellulose (HEC) and carboxymethyl-cellulose. Other thickeners which may be used are casein, gum arabic, gum tragacanth, starch, sodium alginate, polyvinyl alcohol, polyvinylpyrrolidone, sodium polyacrylate and water-soluble copolymers based on acrylic and methacrylic acid, such as acrylic acid/acrylamide and methacrylic acid/acrylic ester copolymers. Hydrophobically-modified alkali soluble (acrylic) emulsions (HASE), hydrophobically-modified ethoxylate (poly)urethanes (HEUR), and polyether polyols (PEPO) are also available.

Inorganic thickeners, such as, for example, bentonites or hectorite, may also be used.

Such thickeners are generally employed in amounts from 0.1 to 3% by weight, preferably 0.1 to 1% by weight, based on the total weight of the aqueous preparations.

The thickener may be incorporated already during the dispersion of the fillers and pigments in water with the addition of a dispersant and, if desired, an antifoam, for example using a dissolver; however, the thickener may also be added to the finished preparation, provided that the water balance of the finished construction protective material permits this to be done.

The synthetic resin copolymer dispersion used as binder according to the invention may already be present during the dispersion of the pigment and filler, but in most cases it is advantageously added to the filler/pigment paste which is still hot or also cooled, under rapid or also slower stirring. In order to maintain a pigment volume concentration of 25% and above, 4 to 35 parts by weight of synthetic resin dispersion copolymer are used per 65 to 95.9 parts by weight of filler+pigment.

One feature that affects the overall combination of properties in a latex paint formulation is the particle size range present in the emulsion. When the proportion of large particles is high, scrub resistance of the resulting paint is reduced. When the proportion of fines, i.e., those particles having a size less than 0.2 microns, is high, the paint will have poor flow and leveling characteristics. The particle size of latex in the polymer emulsion can be affected by adjusting the level of protective colloid or surfactant concentration added initially or incrementally during polymerization. Agitation is another variable which can affect particle size in the polymer emulsion. These factors may be adjusted as necessary by methods known in the art.

For various applications, it is sometimes desirable to include small amounts of additives, such as bactericides, pH modifiers, and antifoamers, incorporated in the latex. This may be done in a conventional manner and at any convenient point in the preparation of the latexes.

A feature according to the invention is that the paint formulations according to the invention are free from readily volatile residual monomers, from low alcohols and from ammonia and/or volatile amines or from components which give rise by cleavage to $H_2S$ or mercaptans, if appropriate, and the total volatile organic content of the paint formulations is <0.1% by weight, based on the total non-volatile part.

Furthermore, the preparations according to the current invention are free of alkyl phenol ethoxylates (APE) and octyl phenol ethoxylates, a class of compounds typically used as surfactants that degrade to phenols; i.e., the paint formulation of the current invention is APE-free. These compounds are of environmental concern due to their estrogen mimicking characteristics.

Accordingly, the subject matter of the invention are low-emission, high-scrub VAE latex dispersion paint formulations in the form of aqueous preparations based on aqueous synthetic resin dispersion polymers of the class disclosed in U.S. Pat. No. 5,576,384 to Nolken, et al., the disclosure of which is incorporated herein by reference. The paints of this invention have a pigment volume concentration (PVC) of from about 25 to about 85 weight %; and contain water, fillers, pigments, synthetic resin dispersion polymers, and auxiliaries selected from the group consisting of wetting agents, dispersants, emulsifiers, protective colloids, thickeners, antifoams, dyes, pH adjusters/buffers, non-APE non-ionic surfactants, and preservatives. The non-volatile part of the paint formulation contains 10 to 94% by weight of a filler,
2 to 30% by weight of a pigment,
0.1 to 10% by weight of an auxiliary and
2 to 40% by weight of a synthetic resin dispersion copolymer, based on the total non-volatile part. The dispersion copolymer possesses a K-value greater than 60 coupled with a gel content greater than 50% and the synthetic resin dispersion copolymer preferably has a content of monomeric units derived from unsaturated hydrolysable organic silicon compounds. In particular, the synthetic resin dispersion copolymer preferably incorporates from 0.1 to 5 weight % of the residue of a silane monomer. More preferably, 0.1 to 0.5 weight % of the residue of a silane monomer is incorporated.

If appropriate, the following components may be added as auxiliaries in addition to the constituents from the synthetic resin copolymer dispersion:

0.1 to 0.6% by weight of a wetting agent or dispersant for filler and pigment,
0.1 to 1% by weight of a thickener,
0.01 to 2% by weight of a preservative and
0.001 to 0.5% by weight of an anti-foam,
each based on the total weight of the aqueous preparations.

Commercially available pigment pastes may be used to tint dispersion paints, or pigment may be admixed with the synthetic resin dispersion or the white dispersion paint or the dispersion plaster in the dry state, if desired.

Alkali metal salts may be used instead of ammonium salts and amine salts in preparing the copolymer dispersion to avoid undesirable odors and volatilized amine emissions.

Synthetic resin copolymer dispersions based on vinyl acetate/ethylene are preferably used for the odorless aqueous preparations, low in noxious substances emission, of construction protective materials, in addition to water, filler, pigment, dispersant, thickener, antifoam, and preservative.

The above dispersion copolymers based on vinyl acetate/ethylene and with comonomers of the silane class are particularly preferred according to the invention.

When these dispersion copolymers are used as binders in the paint formulations under discussion, the so-called crazing of the dried coating and of the dried coating even after only a brief drying period of the preparation, as assessed by the resistance to washing and shearing of coatings according to DIN 53,778, does not occur, despite the absence of solvents and film-consolidating auxiliaries, i.e., the coating possesses mechanical strength after a brief drying period, as can be frequently observed with paints derived from polymer dispersions.

Those aqueous preparations of construction protective materials according to the invention are particularly suitable and preferred which contain solvent-free synthetic resin copolymer dispersions as binders and whose copolymers contain monomeric units derived from silicon compounds, which units are capable of copolymerization and carry hydrolysable silicon-containing radicals or form $Si(OH)_x$ groups (x=1 to 3), and the copolymers were prepared by emulsion copolymerization from combinations of comonomers which result in the required values, in the presence of a thickener, a non-ionic emulsifier, and small amounts of monomeric sulfur compounds.

It is believed that a branched polymer architecture in the copolymer exhibits a higher tensile storage modulus at elevated temperatures. One can generate a range of aqueous copolymer dispersions containing a range of $T_g$ and a high tensile storage modulus at high temperatures; i.e., temperatures of about 115° C. The tensile storage modulus profile for these polymers provides an insight to the distribution of vinyl acetate and ethylene in the polymer and the melt flow characteristics. They have specific viscoelastic properties as indicated by tensile storage modulus of the cast film.

It cannot be simply assumed or deduced from the above state of the art that synthetic resin dispersions with or without silanol groups may also give rise to an improvement of the scrubbability of the coatings produced by the paints.

Typical characteristics of a resin used in a paint formulation according to the invention are described below.

TABLE 1

VAE Resin Characteristics

| | |
|---|---|
| Stabilizing system | Emulsifier |
| Solid content | 55% |
| Viscosity | 50-1000 cps |
| Average particle size | 200 nm |
| $T_g$ | 13° C. |
| MFFT | 0° C. |
| pH | 4.5-6 |
| Film on glass | Clear |

Comparative approximate characteristics of EcoVAE® 405 Series latices used in a paint formulation according to the invention in relation to Celvolit® 1774 and a high molecular-weight commercial latex are described in Table 2, below.

TABLE 2

Comparative Resin Characteristics

| Sample | Solids, % | Viscosity, cps | pH | $T_g$ | MFFT, ° C. | VAM, ppm |
|---|---|---|---|---|---|---|
| Celvolit ® 1774 | 55.7 | 294 | 5.2 | 10.0 | 0 | 900 |
| EcoVAE ® Series 405 Latex A | 55.8 | 396 | 5.3 | 9.6 | 0 | 600 |
| EcoVAE ® Series 405 Latex B | 55.2-56.1 | 262-510 | 5.3 | 10.0-10.8 | 0 | close to 500 |

Ingredients and procedure for preparing a paint formulation according to the invention are described as in Tables 3 and 4, below. Characteristics of the inventive paint formulation comprising a resin as described above are also listed below, first for a flat paint, and subsequently for an eggshell paint.

TABLE 3

Flat (51 PVC)

| Ingredient | Amount (lbs) |
|---|---|
| Water | 208.00 |
| Ethylene Glycol (cosolvent) | 18.50 |
| Nuosept ® 498 (preservative) | 0.75 |
| Carbowet 100 (surfactant) | 4.00 |
| Drewplus T-4507 (defoamer) | 0.50 |
| Natrosol Plus 330 (thickener) | 2.00 |
| Mix, then add: | |
| AMP 95 (pH adjuster/buffer) | 2.00 |
| Nuosperse FX605 L (dispersing agent) | 7.50 |
| Kelzan S (suspending/thickening/dispersing agent) | 0.50 |
| Diafil 525 (extender pigment) | 40.00 |
| Huber 70C (extender pigment) | 90.00 |
| Camelwite (extender pigment) | 145.00 |
| Kronos 2310 (pigment) | 180.00 |
| Disperse to 2-3 Hegman | |
| Water | 125.00 |
| Cognis DSX 3800 (thickener) | 10.50 |
| VAE resin | 307.50 |
| Drewplus T-4507 (defoamer) | 4.00 |
| Water | 22.00 |
| Total | 1167.75 |
| Viscosity | 95-100 Kreb Units (KU) |
| pH | 8.8-9.2 |
| Weight per Gallon | 11.6 ± 0.1 pounds per gallon |
| 60° Gloss | 1-3 |
| 85° Sheen | 1-3 |
| Dry to Touch | 2 hours |
| VOC | <60 G/L |

TABLE 4

35 PVC Eggshell

| Ingredient | Amount (lbs) |
|---|---|
| Water | 250.0 |
| Propylene Glycol (cosolvent) | 10.0 |
| Natrosol Plus 330 (thickener) | 2.2 |
| AMP-95 (pH adjuster/buffer) | 3.0 |
| Acticide BW-20 (preservative) | 1.1 |
| Cognis A-38 Defoamer | 2.5 |
| Tamol 1124 Dispersant | 3.6 |
| Carbowet 106 (surfactant) | 3.0 |
| Mix, then add: | |
| Tronox CR-826 (pigment) | 200.0 |
| Minex 7 (extender pigment) | 50.0 |
| Optiwhite (extender pigment) | 75.0 |
| Water | 73.5 |
| Disperse to 5.0-6.0 Hegman | |
| Letdown: | |
| VAE resin | 375.0 |
| Texanol (cosolvent) | 10.0 |
| RM-825 (thickener) | 14.0 |
| Cognis A-38 Defoamer | 2.5 |
| Water | 11.7 |
| Total | 1075.4 |
| PVC | 35% |
| Volume Solids | 35% |
| VOC | <100 g/L |
| Viscosity | 95-100 KU |
| ICI[1] | 1.0-1.1 |
| pH | 8.5-9.5 |
| Weight per Gallon | 10.8 ± 0.1 pounds per gallon |
| 60° Gloss | 4.0-5.0 |
| 85° Sheen | 9.0-10.0 |
| Contrast Ratio | 96.8 |
| Y Reflectance | 91.3 |

[1]Imperial Chemical Industries (ICI) number refers to a rheological instrument which is used to measure high shear viscosity. A higher ICI number indicates a thicker coating would adhere to the substrate.

Materials Description and Source

NUOSEPT™ 498 is a 1,2-benzisothiazolin-3-one preservative, available from International Specialty Products.

CARBOWET® 100 is a surfactant for pigment and substrate wetting, available from Air Products.

DREWPLUS® T-4507 is a foam control agent, available from Ashland Water Technologies, Drew Industrial.

NATROSOL® PLUS 330 is a hydroxyethyl cellulose thickener, available from Aqualon™, a business unit of Hercules™.

AMP-95® is a 2-amino-2-methyl-1-propanol pH adjuster/buffer, available from ANGUS Chemical Company.

NUOSPERSE® FX 605 L is a dispersant, available from Elementis™ Specialties, Inc.

Kelzan® S is a xanthan gum suspending/thickening/dispersing agent, available from CP Kelco™.

DIAFIL® 525 is diatomaceous earth filler, available from World Minerals™.

HUBER® 70C Calcined Kaolin Clay is a filler, available from Huber™ Engineered Materials.

Camelwite is a calcium carbonate filler, available from Imerys™/CR World Minerals.

Kronos™ 2310 is a titanium dioxide pigment, available from Kronos™.

DSX® 3800 is a thickener, available from Cognis-Polymers, Coatings and Inks.

ACTICIDE® BW 10/BW 20 is an aqueous-based benzisothiazolinone preservative, available from Thor Specialties, Inc.

FoamStar™ A-38 is a dispersible modified defoamer, available from Cognis-Polymers, Coatings and Inks.

Tamol® 1124 is a dispersant, available from Rohm and Haas™ Company.

CARBOWET® 106 is an alcohol ethoxylate surfactant, available from Air Products™-Additives.

TRONOX™ CR-826 is a silica/alumina-treated rutile pigment, available from Tronox™, Inc.

Minex™ 7 is a nepheline syenite extender pigment, available from Unimin™ Specialty Minerals, Inc.

OPTIWHITE P® is a calcined aluminum silicate extender pigment, available from Burgess Pigment.

TEXANOL™ ester alcohol is a coalescent, available from Eastman™ Coatings Film Technologies.

ACRYSOL™ RM-825 is a hydrophobically modified polyethylene oxide urethane thickener, available from Rohm and Haas™ Company.

EcoVAE™ 405 Series is a high-scrub, low residual monomer, low-odor vinyl acetate/ethylene (VAE) emulsion, available from Celanese™ (Emulsion Polymers), Houston, Tex., which may be obtained by simply requesting high-scrub VAE resin or requesting suitable resins using like terminology.

The invention is elucidated in greater detail by the examples below. In the Examples, parts and percentages are by weight. In the examples below, the high molecular weight commercial latex provides a resin of the class disclosed in U.S. Pat. No. 5,874,498 to Daniels et al., and the Celvolit® 1774 example provides a resin of the class disclosed in U.S. Pat. No. 5,576,384 to Nolken et al. EcoVAE® 405 Series Latex A is a newly available resin that does not contain silane. EcoVAE® 405 Series Latex B is a newly available resin that contains silane in the polymer structure.

The following test procedures and organic-solvent-free, latex paint formulations were used to evaluate the latex binders and latex paints of the present invention.

ASTM D4946 is used to evaluate blocking of a paint formulation. The Blocking Resistance Method Standard Operating Procedure is as follows.

Materials Required
1. (6") 6 mil Clearance Bird Bar
2. Vacuum Plate
3. Sealed Test Chart
4. Paint Sample
5. Paper Cutter
6. 1 kg weight
7. 50° C. Oven
8. Stopwatch or Timer Procedure
Preparation of Drawdown
1. Turn on vacuum pump.
2. Center test chart on vacuum plate and label appropriately.
3. Ensure paint sample is homogenous (stir first).
4. Place a clean, 6 mil drawdown bar below labeled portion of chart.
5. Dab sufficient paint near the edge of the blade to form a continuous film the length of the panel.
6. Draw 6 mil bar slowly and evenly to the length of the chart.
7. Clean and dry the bar immediately.
8. Remove the chart to a horizontal surface.
Repeat procedure for each sample.

Preparation of Test Samples
The block test may be performed once the cards have conditioned a minimum of (16) sixteen hours.
1. Using a paper cutter, cut fully paint covered squares 1.5" (4 cm) wide. Four squares are required for each period of testing.
2. Pair the squares face-to-face and label each with the appropriate information (Sx ID, Oven (OV), or ambient (RT)).
3. Place one pair of squares in constant temperature room on a continuous flat surface/benchtop.
4. Center one #8 rubber stopper (narrow end down) and place weight totaling 1000 g on square.
5. Remove stopper and weight from this pair of squares the next day.
6. Place the second pair in the 50° C. oven and repeat step 4.
7. After 30 minutes remove pair from oven to cool.

Evaluation of Test Samples
Evaluation of samples may be required after the panels have dried 24 hours, 48 hours, 72 hours, 4 days, 5 days, or 7 days. Record the results.
1. Pull the squares apart, listening for sounds tack and looking for signs of film damage or rupture.
2. Rate squares according to the given numerical ratings per Table 5.

TABLE 5

| Rating of Block Resistance Samples | |
|---|---|
| Rating | Description |
| 10 | No tack |
| 9 | Trace tack |
| 8 | Very slight tack |
| 7 | Very slight to slight tack |
| 6 | Slight tack |
| 5 | Moderate tack |
| 4 | Very tacky |
| 3 | Film ruptures 5-25% |
| 2 | Film ruptures 25-50% |
| 1 | Film ruptures 50-75% |
| 0 | Film ruptures 75-100% |

The dye stain test is a porosity test used by the paint industry to look at film porosity/sealing of the paint surface for flat through eggshell finishes. The test is conducted as follows:
1) Make a 1% solution by weight of water-dispersible Nigrosin dye.
2) Make a 3 mil wet draw down side-by-side on a Leneta card and cure overnight.
3) Using a 1-2" foam brush, apply a liberal amount of the 1% dye stain solution across the card and allow to sit for 1 minute.
4) Take a damp sponge and wipe off the excess dye after 1 minute. Wipe a total of three times, using a clean surface on the sponge each time.
5) Allow to dry.

Figure 4:
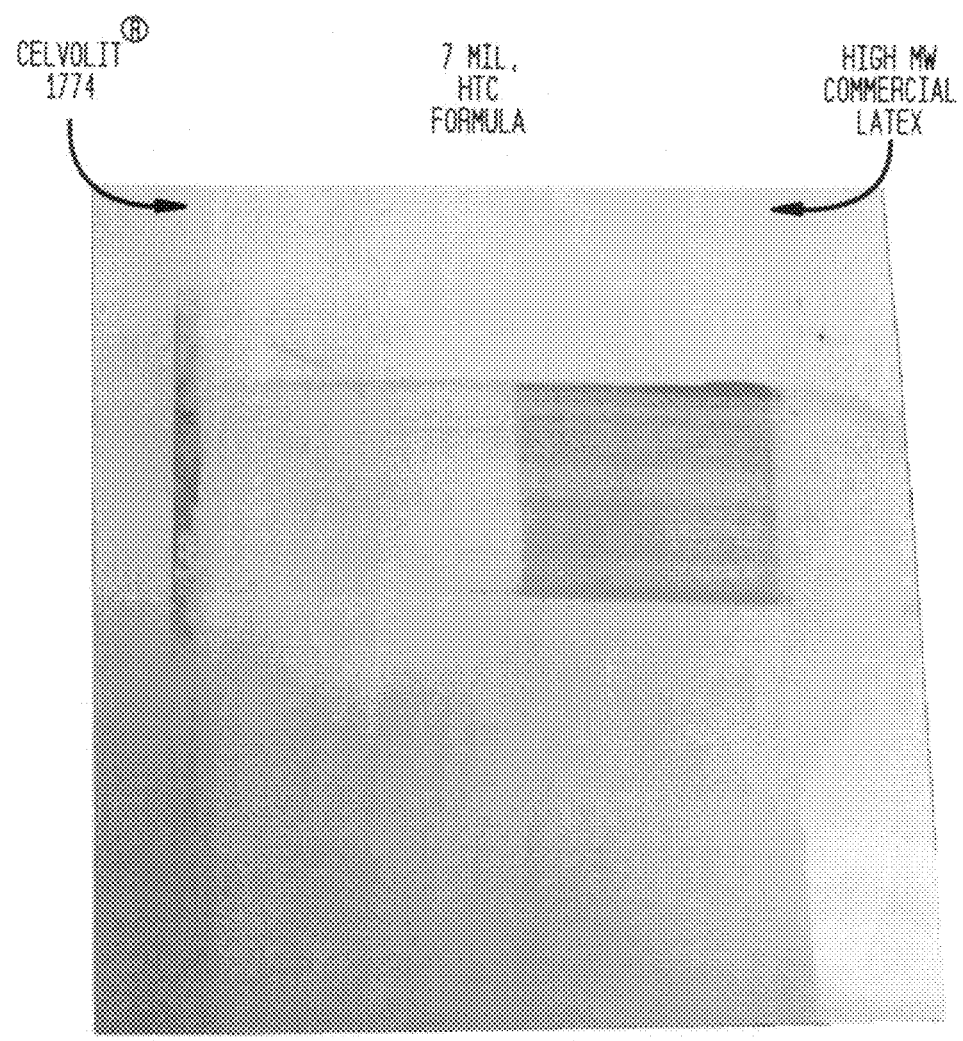
FIG. 4 is a visual example illustrating a dye stain test.

Results may be rated visually, or the change in L* value compared to the white paint for the stained section may be measured. See FIG. 4.

The Fikentscher K value range (H. Fikentscher, Cellulosechemie 13 (1932), 58-64 and 71-74) is a measure of intrinsic viscosity analogous to DIN 53726, and indicative of the molecular weight of a polymer. As the K value increases, the strength and scrubbability correspondingly increase. To determine the K value, dissolve an equivalent of 1 g of dry polymer (=2 g of a 50% solids containing dispersion) in 100 ml dimethyl formamide (DMF) at room temperature while stirring (until completely dissolved, at least 1 h), and determine the viscosity of the solution at 23° C., using a Mikro-Ostwald-Viscometer (Capillary type 518 13/I c [2 ml]; Schott AVS 400+CT1150). Then determine the viscosity of 1 g of water in 100 ml DMF at 23° C. in the same viscometer. Insert the viscosity readings and the polymer concentrations into equation A and calculate the k value. The K value is obtained by multiplying the k value by 1000.

$$\log \eta_c/\eta_o = [(75*k^2)/(1+1.5k*c)+k]*c \quad (A)$$

Scrub resistance was tested as follows. A test scrub panel was prepared by drawing a 7.0 mil film of paint on a Leneta chart and allowing the paint to dry for 7 days in an open room maintained at 23±2° C. and 50±5% relative humidity. The dried chart was affixed to a glass panel and put into a scrub machine equipped with a scrub brush and a basin for holding the test panel. The brush was prepared by immersing it overnight in water. The brush was placed in the machine holder and the test scrub panel was put under the brush. The brush bristles were spread evenly with 10 grams of a standardized scrub medium (available from BYK-Gardner). The panel was then wet with 5 ml of reagent water in the path of the brush. The scrub machine was started. After every 400 strokes before failure, 10 grams of scrub medium and 5 ml of reagent water were added to the brush bristles. The number of strokes to the paint at which 0.5 inch of black chart shows through the test panel was recorded. Table 6 provides test results for paint formulations containing various resins. The paint formulations have approximately the scrub values shown below. The Relative Scrub Index of a latex is expressed in percent relative to Celvolit® 1774 latex (being a value of 100%) in a 51 PVC formulation as described hereinafter. Celvolit® 1774 characteristics are provided in Table 2, above.

TABLE 6

K-value and Scrub Results

| | K-Value | Scrub cycles, ½" Scrub in 51 PVC | Relative Scrub Index, ½" Scrub in 51 PVC vs. Celvolit® 1774 | Ratio of Relative Scrub Index to K-value |
|---|---|---|---|---|
| Celvolit® 1774 | 48.6 | 596 | 100% | 2.06 |
| High molecular-weight commercial latex | 94 | 1133-1492 | 192% | 2.04 |
| EcoVAE® 405 Series Latex A | 83.6 | 1349 | 229% | 2.74 |
| EcoVAE® 405 Series Latex B | 71.2-93.1 | 839-2184 | 165-240% | 2.32-2.58 |

As can be seen in Table 6, K-values of the EcoVAE® 405 Series latices exceed that of the Celvolit® 1774 and are in the range of that of the high molecular weight commercial latex. However, the EcoVAE® 405 Series latices may be used to produce a paint formulation that exhibits a surprisingly higher ratio of relative scrub index to K-value than either the high molecular-weight commercial latex or the Celvolit® 1774. Without being bound by theory, improved scrubbability might be additionally correlated with the combination of crosslink density, molecular weight, tensile strength and film toughness of the new EcoVAE® 405 Series latices.

Tensile Storage Modulus

There is a correlation between K-values and G' (storage modulus) values; samples with higher K-values show higher G' values. Tensile storage modulus as a function of temperature was measured at a test frequency of 6.28 rad/sec and expressed as Pascals. More specifically, dynamic mechanical testing of the polymer samples for measuring shear storage modulus may be measured using the following procedure. Each polymer emulsion was cast as a film and dried for four days at 23° C. and a humidity between 50 and 60%. The dry film thickness was typically in the range between 0.4 and 0.7 µm. A round test specimen was cut with a circular cutter and a diameter of 25 mm. The specimens were tested on a Malvern™ CVO 120 rheometer with a plate—plate geometry with each 25 mm diameter (measuring system ETC PP 25) to determine the shear storage modulus G' as a function of temperature. The test specimen was introduced in the system at room temperature. After heating to 130° C. and 420 s compensation time the measurement was started. Data were obtained over a range from 130 to 0° C. with a cooling rate of 2 K/min and a frequency of 6.28 rad/s. The deformation was 0.064 with an initial stress of 1000 Pa. Due to a different gap in between the two plates, depending on the temperature the gap was adjusted automatically in a way that a force of 100 N was always applied on the sample. For each temperature the CVO 120 calculated the shear storage modulus (G') based on the diameter and thickness of the sample. See FIG. 5.

When determining K-value, it is assumed that the sample fully dissolves in the solvent. If there are minute gels, the fraction which is not dissolved would not contribute to the K-value. Therefore, gel content was determined as described below.

Determination of Gel Content (Cured Samples)

1) Sample Preparation:

30 g of dispersion (containing 53-55% solids) were diluted with 20 g of demineralized water, and 2 drops of Agitan® 282 (defoamer) were added. The mixture was carefully stirred for 15 minutes at room temperature using a magnetic stirrer bar. The mixture was poured onto a Teflon® plate (diameter: 17.8 cm, height 4 mm). After drying for 72 hours at 25° C. and 50% humidity, the film was turned and dried under the same conditions for an additional 24 hours. The films were cured for 14 hours at 125° C.

2) Determination of Gel Content 2.00 g ($W_0$) of polymer film were weighed into centrifuge tubes, 15 ml of tetrahydrofuran (THF) were added, and the samples were capped and shaken for 40 hours. The tubes were centrifuged (30 minutes @ 15,000 rpm) and the transparent layer was poured out. The remaining sample (presumed to be the gel) was dried and weighed ($W_1$). The gel content [%] was calculated from the following expression:

$$\text{Gel content [\%]} = (W_1/W_0)*100$$

TABLE 7

Gel Content of Cured Resin Samples

| Description | Weight (dried gel) [g] | Gel content [%] |
|---|---|---|
| Celvolit ® 1774 | 1.98 | 99.0% |
| High molecular weight commercial latex | 0.69 | 34.5% |
| EcoVAE ® 405 Series Latex A | 0.17 | 8.5% |
| EcoVAE ® 405 Series Latex B | 1.92-2.00 | 96-100% |

The cured EcoVAE® Latex A exhibits a lower gel content than any of other the samples disclosed in Table 7.

Determination of Gel Content (Uncured Samples)

1) Sample Preparation:

30 g of dispersion (containing 53-55% solids) were diluted with 20 g of demineralized water, and 2 drops of Agitan® 282 (defoamer) were added. The mixture was carefully stirred for 15 minutes at room temperature using a magnetic stirrer bar. The mixture was poured onto a Teflon® plate (diameter: 17.8 cm, height 4 mm). After drying for 72 hours at 25° C. and 50% humidity, the film was turned and dried under the same conditions for an additional 24 hours. The films were dried for an additional 11 days (films were turned over daily).

2) Determination of Gel Content 2.00 g ($W_0$) of polymer film were weighed into centrifuge tubes, 15 ml of THF were added, and the samples were capped and shaken for 40 hours. The tubes were centrifuged (30 min @ 15,000 rpm) and the transparent layer was poured out. The remaining sample (presumed to be the gel) was dried and weighed ($W_1$). The gel content [%] was calculated from the following expression:

Gel content [%]=$(W_f/W_0)*100$

TABLE 8

Gel Content of Uncured Resin Samples

| Description | Remarks | Weight (dried gel) [g] | Gel content [%] |
|---|---|---|---|
| Celvolit ® 1774 | Solvent completely absorbed | 2.0 | 100 |
| High molecular weight commercial latex | Viscous hazy solution | 0 | 0 |
| EcoVAE ® 405 Series Latex A | Viscous hazy solution | 0 | 0 |
| EcoVAE ® 405 Series Latex B | Solvent completely absorbed | 2.0 | 100 |

As can be seen in Table 8, the uncured EcoVAE® 405 Series Latex A exhibits a gel content comparable to the uncured high molecular weight commercial latex, whereas the uncured EcoVAE® 405 Series Latex B exhibits a gel content comparable to the uncured Celvolit® 1774.

Determination of Relative Swelling Ratio, $S_r$

1) Sample Preparation:

30 g of dispersion (containing 53-55% solids) were diluted with 20 g of demineralized water, and 2 drops of Agitan® 282 (defoamer) were added. The mixture was carefully stirred for 15 minutes at room temperature using a magnetic stirrer bar. The mixture was poured onto a Teflon® plate (diameter: 17.8 cm, height 4 mm). After drying for 72 hours at 25° C. and 50% humidity, the film was turned and dried under the same conditions for an additional 24 hours.

The films were cured for (a) 7.5 minutes at 125° C., or (b) 14 hours at 125° C.

Using a die cutter, round plates with a diameter of 1.5 cm were prepared.

2) Determination of the $S_r$-Value

One sample each was mixed with 28 ml of solvent in a 100 ml beaker, and left to soak for 3 hours. The contents were then poured onto a Petri dish lying on a graph paper and the diameter was measured. The $S_r$-value was calculated as follows:

$S_r$=(diameter of swollen sample [cm])/1.5 cm

A) Curing for 7.5 minutes @ 125° C.

TABLE 9

Resin Swelling Results after 7.5 minutes curing @ 125° C.

| Description | Thickness [mm] | Diameter [cm]; solvent: THF (sample 1/ sample 2) | $S_r$ (THF) (avg. of 2 measurements) | Diameter [cm]; solvent: Acetone (sample 1/ sample 2) | $S_r$ (Acetone) (avg. of 2 measurements) |
|---|---|---|---|---|---|
| Celvolit ® 1774 | 0.40 +/- 0.02 | dissolved | — | dissolved | — |
| High molecular weight commercial latex | 0.55 +/- 0.02 | dissolved | — | dissolved | — |
| EcoVAE ® 405 Series Latex A | 0.53 +/- 0.02 | dissolved | — | dissolved | — |
| EcoVAE ® 405 Series Latex B | 0.42 +/- 0.02 | 4.2/4.4 | Up to 2.9 | 4.1/4.2 | Up to 2.8 |

As shown in Table 9, only the EcoVAE® 405 Series Latex B exhibited measurable swelling in either solvent. Without intending to be bound by theory, the swelling exhibited by the EcoVAE® Series 405 resins is believed to be representative of trapped solvent. Results following further curing and using other solvents are shown below.

B) Curing for 14 h @ 125° C.

TABLE 10

Resin Swelling Results in THF after 14 hours curing @ 125° C.

| Description | Thickness [mm] | Diam. [cm]; solvent: THF (sample 1/ sample 2) | $S_r$ (THF) [avg. of 2 measurements] |
|---|---|---|---|
| Celvolit ® 1774 | 0.40 +/− 0.02 | 4.6/4.8 | 3.1 |
| High molecular weight commercial latex | 0.55 +/− 0.02 | dissolved | — |
| EcoVAE ® 405 Series Latex A | 0.53 +/− 0.02 | dissolved | — |
| EcoVAE ® 405 Series Latex B | 0.37-0.59 +/− 0.02 | 4.3-5.3/4.3-5.3 | 2.9-3.5 |

As shown in Table 10, above, the high molecular weight commercial latex and the EcoVAE® 405 Series Latex A both dissolved in THF. Swelling results for the EcoVAE® 405 Series Latex B was slightly lower than that of the Celvolit® 1774. No difference was noted when the resins were soaked in n-heptane.

As can be seen in Table 11, similar results were achieved when soaking the resins in acetone as were discussed for soaking the resins in THF, although Celvolit® 1774 and the EcoVAE® 405 Series Latex B exhibited slightly lower swelling in acetone than in THF. Similar results were achieved when soaking the resins in i-propanol as were discussed for soaking the resins in n-heptane, although both EcoVAE® 405 Series latices exhibited slightly higher swelling in i-propanol than was exhibited in n-heptane. Refer to the discussion below Table 10, above.

TABLE 11

Resin Swelling Results in Acetone and i-Propanol after 14 hours curing @ 125° C.

| Description | Thickness [mm] | Diam. [cm]; solvent: Acetone (sample 1/ sample 2) | $S_r$ (Acetone) [avg. of 2 measurements] | Diam. [cm]; solvent: i-Propanol (sample 1/ sample 2) | $S_r$ (i-Propanol) [avg. of 2 measurements] |
|---|---|---|---|---|---|
| Celvolit ® 1774 | 0.40 +/− 0.02 | 4.4/4.7 | 3.03 | 1.5/1.5 | 1 |
| High molecular weight commercial latex | 0.55 +/− 0.02 | Dissolved | — | 1.5/1.5 | 1 |
| EcoVAE ® 405 Series Latex A | 0.53 +/− 0.02 | Dissolved | — | 1.6/1.7 | 1.10 |
| EcoVAE ® 405 Series Latex B | 0.37-0.59 +/− 0.02 | 4.0-4.7/ 4.0-4.8 | 2.7-3.17 | 1.5-1.7/ 1.5-1.7 | 1-1.13 |

TABLE 12

Resin Swelling Results in ethyl acetate after 14 hours curing @ 125° C.

| Description | Thickness [mm] | Diam. [cm]; solvent: ethyl acetate (sample 1/sample 2) | $S_r$ (ethyl acetate) [average of 2 measurements] |
|---|---|---|---|
| Celvolit ® 1774 | 0.40 +/− 0.02 | 4.5/4.6 | 3.03 |
| High molecular weight commercial latex | 0.55 +/− 0.02 | Dissolved | — |
| EcoVAE ® 405 Series Latex A | 0.53 +/− 0.02 | Dissolved | — |
| EcoVAE ® 405 Series Latex B | 0.37-0.59 +/− 0.02 | 4.0-4.7/4.1-4.6 | 2.7-3.10 |

As can be seen in Table 12, similar results were achieved by soaking the resins in ethyl acetate as were achieved by soaking the resins in acetone. Refer to Table 11, above.

Flat, eggshell, and semigloss paint formulations in accordance with the invention have approximately the block resistance, scrub resistance, and stain resistance values shown below.

TABLE 13

Properties of Paint Formulations Using Various Resins (Flat)

| Resin in 51 PVC Flat Formulation | | Celvolit ® 1774 | High molecular weight commercial latex | EcoVAE ® 405 Series Latex B |
|---|---|---|---|---|
| WPG | | 11.63 | 11.57 | 11.61-11.68 |
| Init. Viscosity (KU) | | 93 | 94 | 87-92 |
| init. pH | | 9.48 | 9.43 | 9.50-9.60 |
| Eq. Viscosity (KU) | | 97 | 95 | 89-96 |
| Eq. pH | | 9.21 | 9.35 | 9.11-9.4 |
| ICI (Poise) | | 0.963 | 0.833 | 0.883-1.296 |
| Low temperature Coalescence | | Pass | Pass | Pass |
| Wet Adhesion (3 mils - 1/3/7 days dry @ RT) | | n/a | n/a | n/a |
| Dry Adhesion (3 mils - 1/3/7 days dry @ RT) | | n/a | n/a | n/a |
| Gloss (20°/60°/85°) (3 mils) 1 day dry @ RT | | 1.2/2.3/2.5 | 1.2/2.3/2.7 | 1.2/2.3/2.6-2.8 |
| 2 days dry @ RT | | 1.2/2.3/2.5 | 1.2/2.3/2.7 | 1.2/2.3/2.5-2.7 |
| 3 days dry @ RT | | 1.2/2.3/2.5 | 1.2/2.3/2.8 | 1.2/2.3/2.7 |
| 7 days dry @ RT | | 1.2/2.3/2.5 | 1.2/2.3/2.8 | 1.2/2.3/2.7 |
| Brightness (3 mils - 24 hrs @ RT - white region) | | 88.96 | 89.04 | 88.95 |
| Contrast Ratio | | 96.71 | 96.48 | 95.77 |
| Stain Resistance (6 mils - 7 days dry @ RT) | % removal | | | |
| Hydrophilic stains | Grape juice | 2 | 2 | 2-5 |
| | Ketchup | 85 | 95 | 95 |
| | Mustard | 5 | 5 | 5 |
| | Coffee | 5 | 5 | 5 |
| Hydrophobic stains | Lipstick | 60 | 50 | 60-95 |
| | Marker | 80 | 90 | 80-90 |
| | Pen | 2 | 5 | 2-5 |
| | Pencil | 80 | 80 | 80 |
| | Crayon | 5 | 5 | 5-10 |

TABLE 14

Properties of Paint Formulations Using Various Resins (Eggshell)

| Resin in 35 PVC Eggshell Formulation | Celvolit ® 1774 | High molecular weight commercial latex | EcoVAE ® 405 Series Latex B |
|---|---|---|---|
| WPG | 10.87 | 10.86 | 10.88-10.89 |
| Init. Viscosity (KU) | 95 | 89 | 79-91 |
| init. pH | 9.45 | 9.50 | 9.34-9.45 |
| Eq. Viscosity (KU) | 96 | 91 | 81-91 |
| Eq. pH | 9.07 | 9.20 | 9.07-9.21 |
| ICI (Poise) | 0.792 | 0.600 | 0.638-0.721 |
| Flow & Levelling (LTB-2 blade, ASTM D4062) | 5 | 5 | 5 |

TABLE 14-continued

Properties of Paint Formulations Using Various Resins (Eggshell)

| Resin in 35 PVC Eggshell Formulation | | Celvolit ® 1774 | High molecular weight commercial latex | EcoVAE ® 405 Series Latex B |
|---|---|---|---|---|
| Flow & Levelling (NYPC blade) | | 2 | 2 | 1-2 |
| Sag Resistance (ASTM-4 blade) | | 17.6 | 15.6 | 13.6-17.6 |
| Low temperature Coalescence | | Pass | Pass | Pass |
| Gloss (20°/60°/85°) (3 mils) 1 day dry @ RT | | 1.3/3.8/8.4 | 1.3/3.8/7.9 | 1.3/3.7-4.1/8.8-9.4 |
| 2 days dry @ RT | | 1.3/3.7/8.0 | 1.3/3.8/7.7 | 1.3/3.6-3.9/8.4-9.0 |
| 3 days dry @ RT | | 1.3/3.6/7.8 | 1.3/3.7/7.3 | 1.3/3.5-3.9/8.1-8.5 |
| 7 days dry @ RT | | 1.3/3.6/7.7 | 1.3/3.6/7.1 | 1.3/3.8/7.9 |
| Brightness (3 mils - 24 hrs @ RT - white region) | | 90.94 | 91.07 | 91 |
| Contrast Ratio | | 96.41 | 96.65 | 96.36 |
| Stain Resistance (6 mils - 7 days dry @ RT) % removal | | | | |
| Hydrophilic stains | Grape juice | 10 | 5 | 5 |
| | Ketchup | 95 | 95 | 95 |
| | Mustard | 5 | 5 | 5 |
| | Coffee | 10 | 5 | 5 |
| Hydrophobic stains | Lipstick | 85 | 70 | 90-95 |
| | Marker | 70 | 90 | 80-90 |
| | Pen | 5 | 5 | 2-5 |
| | Pencil | 25 | 50 | 20-25 |
| | Crayon | 85 | 95 | 90 |

TABLE 15

Properties of Paint Formulations Using Various Resins (Semigloss)

| Resin in 25 PVC Semigloss Paint Formulation | | Celvolit ® 1774 | High molecular weight commercial latex | EcoVAE ® 405 Series Latex B |
|---|---|---|---|---|
| WPG | | 10.64 | 10.66 | 10.68 |
| Init. Viscosity (KU) | | 90 | 84 | 78-88 |
| init. pH | | 9.05 | 9.24 | 8.95-9.13 |
| Eq. Viscosity (KU) | | 94 | 85 | 79-90 |
| Eq. pH | | 8.68 | 8.91 | 8.72-8.85 |
| ICI (Poise) | | 0.738 | 0.663 | 0.738-1.192 |
| Flow & Levelling (LTB-2 blade, ASTM D4062) | | 6 | 6 | 5-6 |
| Flow & Levelling (NYPC blade) | | 3 | 3 | 2-3 |
| Sag Resistance (ASM-4 blade) | | 17.6 | 13.6 | 15.6-17.6 |
| Low temperature Coalescence | | Pass | Pass | Pass |
| Gloss (20°/60°/85°) (3 mils) 1 day dry @ RT | | 11.2/52.2/92.9 | 22.3/64.0/92.3 | 7.5-13.1/41.9-54.0/84.7-91.5 |
| 2 days dry @ RT | | 11.0/52.0/92.6 | 21.4/63.2/92.1 | 6.7-12.3/39.9-53.0/83.5-91.1 |
| 3 days dry @ RT | | 9.9/50.0/92.2 | 21.3/63.0/91.5 | 6.2-12.0/38.6-52.4/83.3-90.3 |
| 7 days dry @ RT | | 9.0/48.6/91.2 | 20.4/62.4/91.5 | 11.1/51.0/89.4 |
| Brightness (3 mils - 24 hrs RT - white region) | | 91.95 | 92.43 | 91.85 |
| Contrast Ratio | | 96.84 | 96.83 | 96.91 |
| Stain Resistance (6 mils - 7 days dry @ RT) % removal | | | | |
| Hydrophilic stains | Grape juice | 5 | 5 | 5 |
| | Ketchup | 95 | 95 | 95 |
| | Mustard | 5 | 5 | 5 |
| | Coffee | 5 | 5 | 5 |
| Hydrophobic stains | Lipstick | 95 | 95 | 95 |
| | Marker | 10 | 70 | 50 |
| | Pen | 5 | 10 | 50 |
| | Pencil | 2 | 5 | 5 |
| | Crayon | 95 | 95 | 95 |

While the invention has been described in connection with several embodiments, modifications of those embodiments within the spirit and scope of the present invention will be readily apparent to those of skill in the art. The invention is defined in the appended claims.

What is claimed is:

1. A water-based, low-emission latex paint formulation comprising:
(a) a vinyl acetate/ethylene (VAE) latex including a VAE resin with from 80 to 94.9 weight % vinyl acetate residue and from 5 to 19.9 weight % ethylene residue, wherein the resin does not contain silane, and wherein the VAE resin incorporates from 0.1 to 5 weight % of the residue of at least one monomer unit selected from the group consisting of acetoacetoxypropyl methacrylate, acetoacetoxyethyl acrylate, acetoacetoxyethyl methacrylate, acetoacetoxybutyl methacrylate, 2,3-di (acetoacetoxy)propyl methacrylate, and allyl acetoacetate, optionally including additional monomer units;
(b) a pigment composition including solids selected from the group consisting of inorganic pigments, inorganic fillers and mixtures thereof present in an amount such that the paint formulation has a pigment volume concentration (PVC) of from 25% to 85%; and (c) one or more auxiliary components selected from the group consisting of wetting agents, dispersants, emulsifiers, protective colloids, thickeners, antifoams, dyes and preservatives;

wherein the latex, pigment composition, and auxiliary components are selected and utilized in amounts such that the paint formulation comprises 2-40% by weight, based on total non-volatile portion of the paint formulation, of a copolymer of the VAE resin, the paint formulation exhibits an elevated scrub value, and the paint formulation is characterized in that (i) the resin has a K-value of greater than 60 and (ii) the ratio of the relative scrub index of the latex to the K-value of the resin is at least 2.25/1; and wherein the resin and the paint formulation are alkylphenol ethoxylate (APE)-free.

2. The water-based, low-emission paint formulation according to claim 1, wherein the ratio of the relative scrub index of the latex to the K-value of the resin is from 2.25/1 to 3.25/1.

3. The water-based, low emission paint formulation according to claim 1, wherein the ratio of the relative scrub index of the latex to the K-value of the resin is at least 2.35/1.

4. The water-based, low emission paint formulation according to claim 1, wherein the ratio of the relative scrub index of the latex to the K-value of the resin is at least 2.45/1.

5. The water-based, low emission paint formulation according to claim 1, wherein the ratio of the relative scrub index of the latex to the K-value of the resin is at least 2.55/1.

6. The water-based, low-emission paint formulation according to claim 1, wherein the VAE resin further includes of at least one additional monomer unit selected from the group consisting of glycidyl acrylate, glycidyl methacrylate, allyl glycidyl ether, vinyl glycidyl ether, vinylcyclohexene oxide, limonene oxide, myrcene oxide, caryophyllene oxide, vinyltoluenes and styrenes substituted with a glycidyl radical in the aromatic moiety, and vinylbenzoates substituted with a glycidyl radical in the aromatic moiety.

7. The water-based, low-emission paint formulation according to claim 6, wherein the additional monomer unit is glycidyl methacrylate.

8. The water-based, low-emission paint formulation according to claim 6, wherein the additional monomer unit is allyl glycidyl ether.

9. The water-based, low-emission paint formulation according to claim 1, wherein the ethylene residue in the resin is from 10 to 15 weight %.

10. The water-based, low-emission paint formulation according to claim 1, wherein the paint formulation PVC is 30 to 70%.

11. The water-based, low-emission paint formulation according to claim 1, wherein the paint formulation PVC is 45 to 55%.

12. The water-based, low-emission paint formulation according to claim 1, wherein the paint formulation PVC is 30 to 40%.

13. The water-based, low-emission paint formulation according to claim 1, wherein the paint formulation has a volatile organic content less than 5 g/L.

14. The water-based, low emission paint formulation according to claim 1, wherein the paint formulation further comprises a block-resistant additive.

15. The water-based, low emission paint formulation according to claim 14, wherein the block-resistant additive is a fluorocarbon surfactant.

16. A water-based, low-emission paint formulation exhibiting improved scrub values, the formulation comprising:
(a) a vinyl acetate/ethylene (VAE) latex including a VAE resin with from 80 to 94.9 weight % vinyl acetate residue and from 5-19.9 weight % ethylene residue, wherein the resin does not contain silane, and wherein the VAE resin incorporates from 0.1 to 5 weight % of the residue of at least one monomer unit selected from the group consisting of acetoacetoxypropyl methacrylate, acetoacetoxyethyl acrylate, acetoacetoxyethyl methacrylate, acetoacetoxybutyl methacrylate, 2,3-di(acetoacetoxy)propyl methacrylate, and allyl acetoacetate, optionally including additional monomer units;
(b) a pigment composition including solids selected from the group consisting of inorganic pigments and inorganic fillers and mixtures thereof present in an amount such that the paint formulation has a pigment volume concentration (PVC) of from 25% to 85%; and
(c) one or more auxiliary components selected from the group consisting of wetting agents, dispersants, emulsifiers, protective colloids, thickeners, antifoams, dyes and preservatives;

wherein the VAE resin exhibits a glass transition temperature ($T_g$) of from about minus 5° to about plus 20° C. measured at a transition midpoint, a K-value of greater than 60 and a latex gel content value upon curing at 125° C. for 14 hours of greater than 50%; wherein the VAE resin and the paint formulation are alkylphenol ethoxylate (APE)-free; and wherein the paint formulation comprises 2-40% by weight, based on total non-volatile portion of the paint formulation, of a copolymer of the VAE resin.

17. The water-based, low-emission paint formulation according to claim 16, wherein the VAE resin has a K-value greater than 60 and a gel content value upon curing at 125° C. for 14 hours of greater than 60%.

18. The water-based, low-emission paint formulation according to claim 16, wherein the VAE resin has a K-value greater than 60 and a gel content value upon curing at 125° C. for 14 hours of greater than 70%.

19. The water-based, low-emission paint formulation according to claim 16, wherein the VAE resin has a K-value greater than 60 and a gel content value upon curing at 125° C. for 14 hours of greater than 80%.

20. The water-based, low-emission paint formulation according to claim 16, wherein the $T_g$ of the resin is from minus 1° to plus 15° C. measured at a transition midpoint with a heating rate of 10 K per minute.

21. The water-based, low-emission paint formulation according to claim 16, wherein the ratio of the relative scrub index of the latex to the K-value of the resin is from 2.25/1 to 3.25/1.

22. The water-based, low emission paint formulation according to claim 16, wherein the ratio of the relative scrub index of the latex to the K-value of the resin is at least 2.35/1.

23. The water-based, low emission paint formulation according to claim 16, wherein the VAE resin exhibits a swelling ratio ($S_r$) value, upon curing at 125° C. for 7.5 minutes, of 2.5 to 3.5 in tetrahydrofuran (THF).

24. The water-based, low emission paint formulation according to claim 16, wherein the VAE resin exhibits a swelling ratio ($S_r$) value, upon curing at 125° C. for 7.5 minutes, of 2.5 to 3.5 in acetone.

25. The water-based, low emission paint formulation according to claim 16, wherein the VAE resin exhibits a swelling ratio ($S_r$) value, upon curing at 125° C. for 14 hours, of 2.5 to 4.0 in tetrahydrofuran (THF).

26. The water-based, low emission paint formulation according to claim 16, wherein the VAE resin exhibits a swelling ratio ($S_r$) value, upon curing at 125° C. for 14 hours, of 2.0 to 3.5 in acetone.

27. The water-based, low emission paint formulation according to claim 16, wherein the VAE resin exhibits a swelling ratio ($S_r$) value, upon curing at 125° C. for 14 hours, of 2.0 to 3.5 in ethyl acetate.

28. A water-based, low-emission latex paint formulation containing a blend of a vinyl acetate/ethylene (VAE) latex and an acrylic latex, wherein the blend comprises:
  (a) 50 to 85 wt % of a VAE latex including a VAE resin with from 80 to 94.9 weight % vinyl acetate residue and from 5 to 19.9 weight % ethylene residue, wherein the VAE resin incorporates from 0.1 to 5 weight % of the residue of at least one monomer unit selected from the group consisting of acetoacetoxypropyl methacrylate, acetoacetoxyethyl acrylate, acetoacetoxyethyl methacrylate, acetoacetoxybutyl methacrylate, 2,3-di (acetoacetoxy)propyl methacrylate, and allyl acetoacetate, optionally including additional monomer units, and wherein the resin does not contain silane;
  (b) 15 to 50 weight % of an acrylic latex;
wherein the paint formulation further comprises:
  (c) a pigment composition including solids selected from the group consisting of inorganic pigments, inorganic fillers and mixtures thereof present in an amount such that the paint formulation has a pigment volume concentration (PVC) of from 25% to 85%; and
  (d) one or more auxiliary components selected from the group consisting of wetting agents, dispersants, emulsifiers, protective colloids, thickeners, antifoams, dyes and preservatives;
and wherein the VAE latex, pigment composition, and auxiliary components are selected and utilized in amounts such that the paint formulation exhibits an elevated scrub value and the paint formulation is characterized in that (i) the VAE resin exhibits a glass transition temperature ($T_g$) of from about minus 5° to about plus 20° C. measured at a transition midpoint, a K-value of greater than 60, and a latex gel content value upon curing at 125° C. for 14 hours of greater than 50%, and (ii) the ratio of the relative scrub index of the latex to the K-value of the VAE resin is at least 2.25/1; and wherein the resin and the paint formulation are alkylphenol ethoxylate (APE)-free.

29. The water-based, low-emission latex paint formulation according to claim 28, wherein the acrylic latex comprises the emulsion polymerization product of at least one monomer unit selected from the group consisting of methyl acrylate, ethyl acrylate, butyl acrylate, 2-ethyl hexyl acrylate, decyl acrylate, methyl methacrylate, butyl methacrylate, iso-butyl methacrylate, isobornyl methacrylate, hydroxylethyl acrylate and hydroxylethyl methacrylate.

30. The water-based, low-emission latex paint formulation according to claim 28, wherein the acrylic latex comprises a styrene acrylic latex.

31. A water-based, low-emission latex paint formulation containing a blend of a vinyl acetate/ethylene (VAE) latex and a vinyl acetate/acrylic copolymer latex, wherein the blend comprises:
  (a) 50 to 85 wt % of a VAE latex including a VAE resin with from 80 to 94.9 weight % vinyl acetate residue and from 5 to 19.9 weight % ethylene residue, wherein the VAE resin incorporates from 0.1 to 5 weight % of the residue of at least one monomer unit selected from the group consisting of acetoacetoxypropyl methacrylate, acetoacetoxyethyl acrylate, acetoacetoxyethyl methacrylate, acetoacetoxybutyl methacrylate, 2,3-di (acetoacetoxy)propyl methacrylate, and allyl acetoacetate, optionally including additional monomer units, and wherein the resin does not contain silane;
  (b) 15 to 50 wt % of a vinyl acetate/acrylic copolymer latex;
wherein the paint formulation further comprises:
  (c) a pigment composition including solids selected from the group consisting of inorganic pigments, inorganic fillers and mixtures thereof present in an amount such that the paint formulation has a pigment volume concentration (PVC) of from 25% to 85%; and
  (d) one or more auxiliary components selected from the group consisting of wetting agents, dispersants, emulsifiers, protective colloids, thickeners, antifoams, dyes and preservatives;
and wherein the VAE latex, pigment composition, and auxiliary components are selected and utilized in amounts such that the paint formulation exhibits an elevated scrub value and the paint formulation is characterized in that (i) the VAE resin exhibits a glass transition temperature ($T_g$) of from about minus 5° to about plus 20° C. measured at a transition midpoint, a K-value of greater than 60, and a latex gel content value upon curing at 125° C. for 14 hours of greater than 50%; and (ii) the ratio of the relative scrub index of the latex to the K-value of the VAE resin is at least 2.25/1; and wherein the resin and the paint formulation are alkylphenol ethoxylate (APE)-free.

32. The water-based, low-emission latex paint formulation according to claim 31, wherein the vinyl acetate/acrylic copolymer latex comprises the emulsion polymerization product of vinyl acetate with at least one monomer unit selected from the group consisting of methyl acrylate, ethyl acrylate, butyl acrylate, 2-ethyl hexyl acrylate, decyl acrylate, methyl methacrylate, butyl methacrylate, iso-butyl methacrylate, isobornyl methacrylate, hydroxylethyl acrylate and hydroxylethyl methacrylate.

33. A water-based, low-emission latex paint formulation comprising:
  (a) a vinyl acetate/ethylene (VAE) latex including a VAE resin with from 80 to 94.9 weight % vinyl acetate residue and from 5 to 19.9 weight % ethylene residue, wherein the resin does not contain silane, and wherein the VAE resin incorporates from 0.1 to 5 weight % of the residue of at least one monomer unit selected from the group consisting of acetoacetoxypropyl methacrylate, acetoacetoxyethyl acrylate, acetoacetoxyethyl methacrylate, acetoacetoxybutyl methacrylate, 2,3-di (acetoacetoxy)propyl methacrylate, and allyl acetoacetate, optionally including additional monomer units;
  (b) a pigment composition including solids selected from the group consisting of inorganic pigments, inorganic fillers and mixtures thereof present in an amount such that the paint formulation has a pigment volume concentration (PVC) of from 25% to 85%; and
  (c) one or more auxiliary components selected from the group consisting of wetting agents, dispersants, emulsifiers, protective colloids, thickeners, antifoams, dyes and preservatives;
wherein the latex, pigment composition, and auxiliary components are selected and utilized in amounts such that the paint formulation comprises 2-40% by weight, based on total non-volatile portion of the paint formulation, of a copolymer of the VAE resin, the paint formulation exhibits an elevated scrub value, and the paint formulation is characterized in that (i) the resin has a K-value of greater than 60 and (ii) the resin exhibits a swelling ratio ($S_r$) value of between 2.0 and 4.5 when cured at 125° C. in a solvent selected from the group consisting of tetrahydrofuran (THF), acetone and ethyl acetate; and wherein the resin and the paint formulation are alkylphenol ethoxylate (APE)-free.

34. The water-based, low emission paint formulation according to claim 33, wherein the VAE resin exhibits a swelling ratio ($S_r$) value, upon curing for 7.5 minutes, of 2.5 to 3.5.

35. The water-based, low emission paint formulation according to claim 34, wherein the VAE resin exhibits a swelling ratio ($S_r$) value, upon curing, of 2.5 to 3.5 in tetrahydrofuran (THF).

36. The water-based, low emission paint formulation according to claim 34, wherein the VAE resin exhibits a swelling ratio ($S_r$) value, upon curing, of 2.5 to 3.5 in acetone.

37. The water-based, low emission paint formulation according to claim 33, wherein the VAE resin exhibits a swelling ratio ($S_r$) value, upon curing for 14 hours, of 2.5 to 4.0 in tetrahydrofuran (THF).

38. The water-based, low emission paint formulation according to claim 33, wherein the VAE resin exhibits a swelling ratio ($S_r$) value, upon curing for 14 hours, of 2.0 to 3.5 in tetrahydrofuran.

39. The water-based, low emission paint formulation according to claim 33, wherein the VAE resin exhibits a swelling ratio ($S_r$) value upon curing for 14 hours, of 2.0 to 3.5 in acetone.

40. The water-based, low emission paint formulation according to claim 33, wherein the VAE resin exhibits a swelling ratio ($S_r$) value, upon curing for 14 hours, of 2.0 to 3.5 in ethyl acetate.

41. A water-based, low-emission latex paint formulation comprising:
(a) a vinyl acetate/ethylene (VAE) latex including a VAE resin with from 80 to 94.9 weight % vinyl acetate residue and from 5 to 19.9 weight % ethylene residue, wherein the resin does not contain silane, and wherein the VAE resin incorporates from 0.1 to 5 weight % of the residue of at least one monomer unit selected from the group consisting of acetoacetoxypropyl methacrylate, acetoacetoxyethyl acrylate, acetoacetoxyethyl methacrylate, acetoacetoxybutyl methacrylate, 2,3-di(acetoacetoxy)propyl methacrylate, and allyl acetoacetate, optionally including additional monomer units;
(b) a pigment composition including solids selected from the group consisting of inorganic pigments, inorganic fillers and mixtures thereof present in an amount such that the paint formulation has a pigment volume concentration (PVC) of from 25% to 85%; and
(c) one or more auxiliary components selected from the group consisting of wetting agents, dispersants, emulsifiers, protective colloids, thickeners, antifoams, dyes and preservatives;
wherein the latex, pigment composition, and auxiliary components are selected and utilized in amounts such that the paint formulation comprises 2-40% by weight, based on total non-volatile portion of the paint formulation, of a copolymer of the VAE resin, the paint formulation exhibits a relative scrub index of greater than 200% and up to 300%; and wherein the resin and the paint formulation are alkylphenol ethoxylate (APE)-free.

42. The water-based, low emission paint formulation according to claim 41, wherein the paint formulation exhibits a relative scrub index of greater than 215%.

43. The water-based, low emission paint formulation according to claim 41, wherein the paint formulation exhibits a relative scrub index of greater than 225%.

44. The water-based, low emission paint formulation according to claim 41, wherein the paint formulation exhibits a relative scrub index of greater than 200% and up to 250%.

45. The water-based, low emission latex paint formulation of claim 1, wherein the paint formulation has a volatile organic content less than 5 g/L and wherein the ratio of the relative scrub index of the latex to the K-value of the resin is from 2.25/1 to 3.25/1.

* * * * *